US012755692B2

(12) United States Patent
Lee et al.

(10) Patent No.: US 12,755,692 B2
(45) Date of Patent: Oct. 6, 2026

(54) DISPLAY APPARATUS AND SENSING METHOD FOR COMPENSATION

(71) Applicant: LG Display Co., Ltd., Seoul (KR)

(72) Inventors: Junyoung Lee, Paju-si (KR); Heeye Oh, Paju-si (KR); Sanggoo Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/529,043

(22) Filed: Dec. 5, 2023

(65) Prior Publication Data

US 2024/0221658 A1 Jul. 4, 2024

(30) Foreign Application Priority Data

Dec. 30, 2022 (KR) ........................ 10-2022-0190660

(51) Int. Cl.
*G09G 3/32* (2016.01)
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/045* (2013.01)

(58) Field of Classification Search
CPC ..... G09G 3/30-3291; G09G 3/00; G09G 3/20
See application file for complete search history.

(56) References Cited

U.S. PATENT DOCUMENTS

2010/0188390 A1* 7/2010 Min ..................... G09G 3/3291 345/82
2011/0216056 A1* 9/2011 Yoo .......................... G09G 3/32 345/212
2014/0176401 A1 6/2014 Kim et al.
2015/0123953 A1* 5/2015 Shim .................... G09G 3/3233 345/205
2015/0154908 A1* 6/2015 Nam .................... G09G 3/3233 345/76

(Continued)

FOREIGN PATENT DOCUMENTS

KR 10-2014-0080243 A 6/2014
KR 10-2019-0016747 A 2/2019

(Continued)

OTHER PUBLICATIONS

Intellectual Property Office of the United Kingdom, Combined Search and Examination Report, United Kingdom Patent Application No. GB2319557.1, Jun. 12, 2024, 10 pages.

*Primary Examiner* — Chanh D Nguyen
*Assistant Examiner* — Nguyen H Truong
(74) *Attorney, Agent, or Firm* — Fenwick & West LLP

(57) ABSTRACT

A display apparatus and a sensing method for compensation is disclosed, and more particularly, a method for sensing and compensating for degradation of a driving transistor of a display apparatus and a display apparatus performing the method is disclosed. A method for sensing a threshold voltage of a driving transistor after a display apparatus is powered on and before an image is displayed, and a display apparatus performing the sensing method are provided. Accordingly, it is possible to reduce the sensing time in sensing the threshold voltage of the driving transistor.

13 Claims, 25 Drawing Sheets

| | | |
|---|---|---|
| SEN1 | Mobility | 2~4 [s] |
| SEN2 | Mobility | 300 [us] |
| SEN3 | Vth | 330 [s] |
| SEN4 | Vth | 2~20 [s] |

(56) References Cited

U.S. PATENT DOCUMENTS

| | | | | |
|---|---|---|---|---|
| 2016/0189623 | A1* | 6/2016 | Miwa | G09G 3/3233 345/212 |
| 2017/0124949 | A1* | 5/2017 | Lee | G09G 5/008 |
| 2018/0012546 | A1* | 1/2018 | Li | G09G 3/3258 |
| 2019/0108792 | A1* | 4/2019 | Hwang | G09G 3/3233 |
| 2021/0201787 | A1* | 7/2021 | Yuan | G09G 3/3291 |
| 2021/0201826 | A1* | 7/2021 | Woo | G09G 3/3233 |
| 2021/0407437 | A1 | 12/2021 | Jang et al. | |
| 2023/0252947 | A1* | 8/2023 | Kim | G09G 3/3233 345/212 |

FOREIGN PATENT DOCUMENTS

| | | | | |
|---|---|---|---|---|
| KR | 10-2020-0025938 | A | | 3/2020 |
| KR | 20200025938 | | * | 3/2020 |
| KR | 10-2021-0082846 | A | | 7/2021 |
| KR | 10-2414311 | B1 | | 6/2022 |

* cited by examiner

| | | |
|---|---|---|
| SEN1 | Mobility | 2~4 [s] |
| SEN2 | Mobility | 300 [us] |
| SEN3 | Vth | 330 [s] |

| | | |
|---|---|---|
| SEN1 | Mobility | 2~4 [s] |
| SEN2 | Mobility | 300 [us] |
| SEN3 | Vth | 330 [s] |
| SEN4 | Vth | 2~20 [s] |

Fig. 9

| Scan line | Sensing value (SV) | LUT value (LV) | Compensation value (compV) |
|---|---|---|---|
| SL1 | 150 | 240 | 240 |
| SL2 | 155 | 248 | 248 |
| SL3 | 120 | 220 | 220 |
| SL4 | 100 | 210 | 210 |
| ... | ... | ... | ... |
| SLM | 155 | 248 | 248 |
| SLM+1 | 170 | 280 | 280 |
| SLM+2 | 175 | 283 | 283 |
| SLM+3 | 173 | 282 | 282 |
| ... | ... | ... | ... |
| SLN-3 | 153 | 244 | 244 |
| SLN-2 | 153 | 244 | 244 |
| SLN-1 | 155 | 248 | 248 |
| SLN | 160 | 270 | 270 |

Fig. 10

| Scan line | Sensing value (SV) | LUT value (LV) | Compensation value (compV) |
|---|---|---|---|
| SL1 | 150 | 240 | 240 |
| SL2 | - | - | 230 |
| SL3 | - | - | 220 |
| SL4 | 100 | 210 | 210 |
| ... | ... | ... | ... |
| SLM | 155 | 248 | 248 |
| SLM+1 | - | - | 259 |
| SLM+2 | - | - | 270 |
| SLM+3 | 173 | 282 | 282 |
| ... | ... | ... | ... |
| SLN-3 | 153 | 244 | 244 |
| SLN-2 | - | - | 253 |
| SLN-1 | - | - | 261 |
| SLN | 160 | 270 | 270 |

DISPLAY APPARATUS AND SENSING METHOD FOR COMPENSATION

CROSS REFERENCE TO RELATED APPLICATION

The present application claims priority to Republic of Korea Patent Application No. 10-2022-0190660, filed on Dec. 30, 2022, which is incorporated by reference in its entirety.

BACKGROUND

Field of Technology

The present specification relates to a display apparatus and a sensing method for compensation, and more particularly, to a method for sensing and compensating for degradation of a driving transistor of a display apparatus and a display apparatus performing the method.

Description of the Related Art

As information society has developed, various types of display apparatus have been developed. Recently, various display apparatus such as a liquid crystal display (LCD), a plasma display panel (PDP), and an organic light emitting display (OLED) have been utilized.

The organic light emitting element constituting the organic light emitting display apparatus is a self-emission type, and does not require a separate light source, so that the thickness and weight of the display apparatus can be reduced. In addition, the organic light emitting display apparatus exhibits high quality characteristics such as low power consumption, high luminance, and high reaction speed.

Such an OLED may have degradation in a display quality due to the characteristics of transistors included within the OLED or due to the degradation of the OLED.

SUMMARY

The present specification is to solve the problems in the technical field described above, and an object of the present specification is to provide a method for sensing a threshold voltage of a driving transistor before an image is displayed after a display apparatus is powered on, and a display apparatus for performing the same.

In addition, an object of the present specification is to reduce a sensing time in sensing a threshold voltage of a driving transistor.

In one embodiment, a display apparatus comprises: a display panel including a plurality of subpixels, each of the plurality of subpixels including a driving transistor; a gate driver configured to supply a scan signal to the plurality of subpixels through gate lines that are connected to the plurality of subpixels; and a data driver configured to supply data voltages to the plurality of subpixels through data lines that are connected to the plurality of subpixels, wherein a fourth sensing during which a threshold voltage of a driving transistor from at least one of the plurality of subpixels is sensed is performed after the display apparatus is powered on and before an image is displayed by the display panel.

In one embodiment, a method for sensing and compensating a display apparatus including a display panel comprising a plurality of subpixels that each include a driving transistor, the method comprising: performing a first sensing of a mobility of the driving transistor after the display apparatus is powered on and before an image is displayed by the display panel; performing a second sensing of the mobility of the driving transistor after the image is displayed; performing a third sensing of a threshold voltage of the driving transistor after the display apparatus is powered off; and performing a fourth sensing of sensing the threshold voltage of the driving transistor after the display apparatus is powered on and before the image is displayed.

In one embodiment, a display apparatus comprises: a display panel including a plurality of subpixels, each of the plurality of subpixels including a driving transistor; a gate driver configured to supply a scan signal to the plurality of subpixels through gate lines that are connected to the plurality of subpixels; and a data driver configured to supply data voltages to the plurality of subpixels through data lines that are connected to the plurality of subpixels, wherein a threshold voltage of a driving transistor in a subpixel from the plurality of subpixels is sensed during a first threshold voltage sensing period responsive to the display apparatus being turned off but the display panel being off and the threshold voltage of the driving transistor is sensed during a second threshold voltage sensing period responsive to the display apparatus being turned off, wherein the first threshold voltage sensing period is shorter than the second threshold voltage sensing period.

According to the present specification, the threshold voltage of the driving transistor can be sensed at a high speed by setting the sampling timing of the threshold voltage of the driving transistor to a point in time before the threshold voltage is saturated.

According to the present specification, the time for sensing the threshold voltage of the driving transistor can be reduced by sensing the threshold voltage of the driving transistor at a high speed.

According to the present specification, by reducing the time for sensing the threshold voltage of the driving transistor, the threshold voltage of the driving transistor can be sensed in a short time after the display apparatus is powered on and before an image is displayed.

Conventionally, only the mobility of the driving transistor can be sensed after the display apparatus is powered on and before the image is displayed. However, according to the present specification, the threshold voltage of the driving transistor can also be sensed. Accordingly, in particular, when the power is turned on while the display apparatus is not driven for a long time, the quality of the image can be improved by sensing and compensating for the mobility and the threshold voltage, compared to the conventional method in which only the mobility is sensed and compensated.

According to the present specification, after the display apparatus is powered on and before an image is displayed, it is possible to select whether to sense only the mobility of the driving transistor or to sense the mobility and threshold voltage of the driving transistor.

BRIEF DESCRIPTION OF THE DRAWINGS

FIG. 9 is a diagram for describing a fourth sensing SEN4 according to an embodiment of the present specification.

FIG. 10 is a diagram for describing a fourth sensing SEN4 according to another embodiment of the present specification.

DETAILED DESCRIPTION

Figure 1:
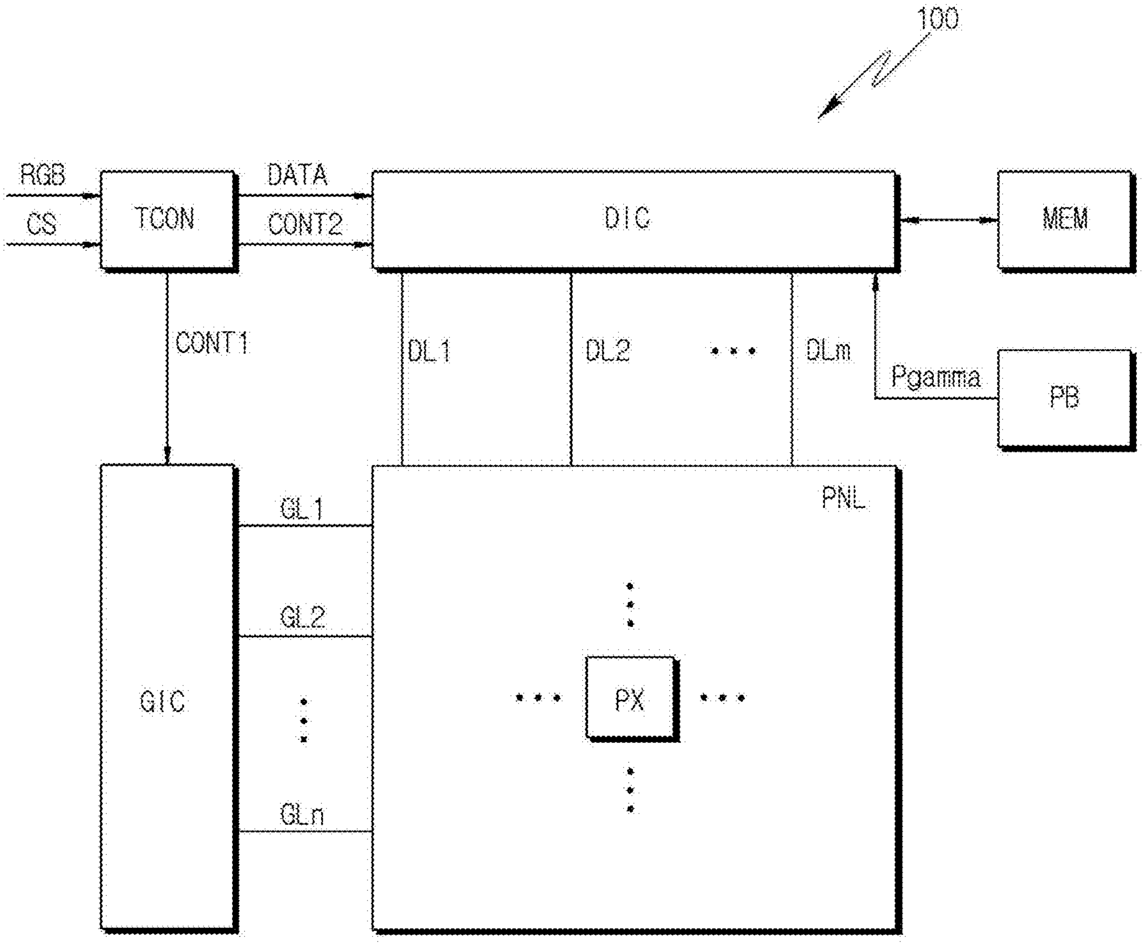
FIG. 1 is a block diagram illustrating a configuration of a display apparatus according to one embodiment of the present specification.

Advantages and features of this disclosure and methods of accomplishing the same may be understood more readily by reference to the detailed description of embodiments that will be made hereinafter with reference to the accompanying drawings. This disclosure may, however, be embodied in many different forms and should not be construed as being limited to the exemplary embodiments set forth herein; rather, these exemplary embodiments are provided so that this disclosure will be thorough and complete and will fully convey the concept of the invention to those skilled in the art, and the present invention will only be defined by the appended claims.

The shapes, sizes, ratios, angles, numbers and the like illustrated in the drawings to describe embodiments of this disclosure are merely exemplary, and thus, the disclosure is not limited thereto. Throughout the specification, the same reference numerals refer to the same components. In addition, detailed descriptions of well-known technologies may be omitted in the disclosure to avoid obscuring the subject matter of the disclosure. When terms such as "comprises," "has," or "is made up of" are used in this specification, it should be understood that unless "only" is specifically used, additional elements can be included. Unless otherwise explicitly stated, when a component is expressed in the singular form, it is intended to encompass the plural form as well.

In interpreting the elements, it is construed to include a margin of error even in the absence of explicit description.

When describing the positional relationship, for example, when the relationship between two parts is described as "on", "on top of", "underneath", "beside", etc., unless "directly" or "immediately" is used, one or more other parts may be located between the two parts.

When a device or layer is referred to as being "on" another device or layer, it includes cases where one device or layer is directly located on the other device or layer or still other device or layer is interposed between the two devices or layers.

Although the terms "first", "second", and the like are used to describe various components, these components are not limited by these terms. These terms are merely used for distinguishing one component from the other components. Therefore, the first component mentioned hereinafter may be the second component in the technical sense of the disclosure.

Throughout the specification, the same reference numerals refer to the same components.

The sizes and thicknesses of each component shown in the drawings are presented for the convenience of description and are not intended to limit the disclosure.

The respective features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Hereinafter, exemplary embodiments will be described in detail with reference to the accompanying drawings.

FIG. 1 is a block diagram illustrating a configuration of a display apparatus according to one embodiment of the present specification.

Referring to FIG. 1, a display apparatus 100 includes a timing controller TCON, a gate driver GIC, a data driver DIC, a power block PB, and a display panel PNL.

The timing controller TCON may receive an image signal RGB and a control signal CS from the outside. The image signal RGB may include a plurality of gradation data. The control signal CS may include, for example, a horizontal synchronization signal, a vertical synchronization signal, and a clock signal.

The timing controller TCON may process the image signal RGB and the control signal CS in conformity with operation conditions of the display panel PNL, and then may output an image data DATA, a gate driving control signal CONT1, and a data driving control signal CONT2.

The gate driver GIC (e.g., a circuit) may be connected with pixels PX of the display panel PNL through a plurality of gate lines GL1 to GLn. The gate driver GIC may generate gate signals on the basis of the gate driving control signal CONT1 output from the timing controller TCON. The gate driver GIC may provide the generated gate signals to the pixels PX through the plurality of gate lines GL1 to GLn.

The data driver DIC (e.g., a circuit) may be connected with the pixels PXs of the display panel PNL through a plurality of data lines DLI to DLm. The data driver DIC may generate data signals on the basis of the image data DATA and the data driving control signal CONT2 output from the timing controller TCON. The data driver DIC may supply the generated data signals to the pixels PX through the plurality of data lines DLI to DLm.

The power block PB (e.g., a circuit) supplies the power used in a memory MEM to the memory MEM and supplies gamma power Pgamma for sensing and compensating for degradation of the driving transistor to the data driver DIC.

The memory MEM may include a volatile memory and a non-volatile memory. The memory MEM may include a plurality of storage devices. For example, a DDR memory having a high-speed bandwidth may be used to store a compensation algorithm for each frame. In addition, a non-volatile NAND memory for storing compensation data may be used.

A plurality of the pixels PXs may be disposed on the display panel PLN. The pixels PXs may be arranged on the display panel PNL in the form of a matrix. Each pixel PX may include subpixels defined for each color. Each subpixel may represent, for example, any one of red, green, blue and white colors. The respective subpixels may emit light with a luminance which corresponds to the gate signal and the data signal which are provided through the gate lines GL1 to GLn and the data lines DLI to DLm.

The timing controller TCON, the gate driver GIC, and the data driver DIC may be configured as a separate integrated circuit (IC) respectively or may be configured as an IC in which at least some of them are integrated.

Also, while the gate driver GIC and the data driver DIC are illustrated in FIG. 1 as separate components from the display panel PNL, at least one of the gate driver GIC and the data driver DIC may be formed integrally with the display panel PNL. For example, an in-panel method may be used for the implementation.

Figure 2:
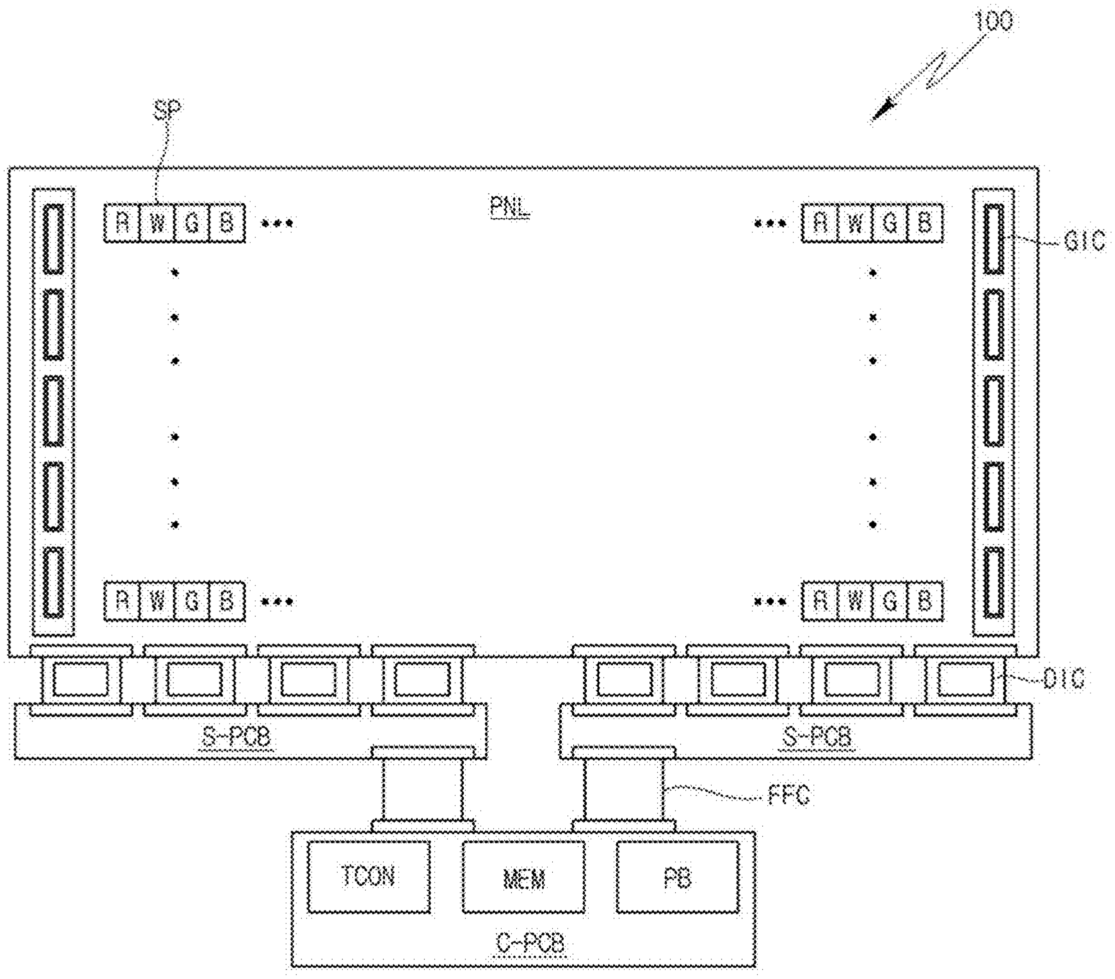
FIG. 2 is a diagram illustrating a display apparatus 100 according to one embodiment of the present specification.

FIG. 2 is a diagram illustrating a display apparatus 100 according to one embodiment of the present specification.

Referring to FIG. 2, the rectangular display panel PNL is illustrated and the display panel PNL includes a plurality of the subpixels SPs arranged therewithin in the form of columns and rows. For example, the plurality of subpixels SPs may include subpixels representing a red color, a white color, a green color, and a blue color.

In addition, the display apparatus 100 may include the gate driver GIC. The display panel PNL may be implemented in a gate-in-panel method in which the gate driver GIC is disposed within the display panel. The gate driver GIC may be formed to the left, right or right and left sides of the display panel PNL.

The display apparatus 100 may include the data driver DIC. The data driver DIC may be attached below the display panel PNL, and a plurality of the data drivers DICs may be attached in the transverse direction of the display panel PNL. Such a data driver DIC may be implemented in a chip on film (COF) method where it is disposed within a flexible PCB (FPCB). Alternatively, the data driver DIC may be implemented in a chip on glass (COG) method where it is disposed on a glass substrate constituting the display panel PNL. In the embodiment illustrated in FIG. 2, the data driver DIC is implemented in the COF method. The data driver DIC may be disposed between the display panel PNL and a source PCB S-PCB through pad connection. The data driver DIC may transmit to each subpixel SP a high potential voltage EVDD, a low potential voltage EVSS, a reference voltage VREF, or the like supplied to each subpixel SP.

The source PCB S-PCB and the control PCB C-PCB may be connected to each other through a cable (a flexible flat cable (FFC)). The source PCB S-PCB may be directly connected to the data driver DIC. The gate driving signal may be supplied to the gate driver GIC through the cable FFC. Power signals (EVDD, EVSS, VGH, VHL, VREF, etc.) supplied from the control PCB C-PCB may be supplied to the panel PNL via the source PCB S-PCB through the cable FFC.

The control PCB C-PCB is disposed below the display panel PNL and is connected to the display panel PNL through the source PCB S-PCB and the cable FPC. The control PCB C-PCB may include the timing controller TCON, the memory MEM and the power block PB. The memory MEM is required to calculate an algorithm for every frame of output image data, store compensation data, and store various parameters required for the algorithm calculation or various parameters for tuning. The memory MEM may include a volatile memory and/or a non-volatile memory. The power block PB may supply power necessary for driving the memory MEM and supply gamma power Pgamma for compensation to the data driver DIC.

Figure 3:
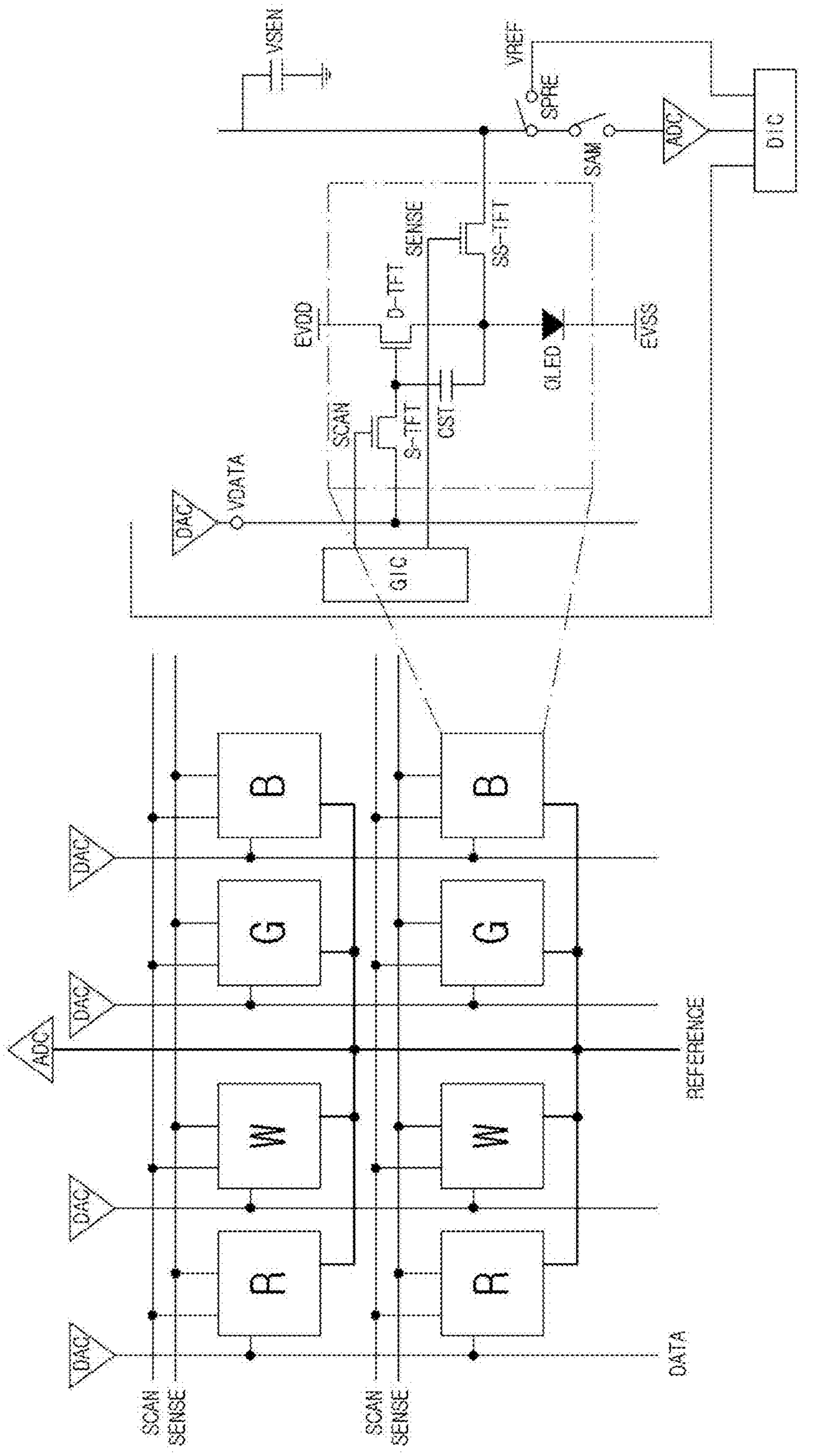
FIG. 3 is diagram for describing a structure of a subpixel according to one embodiment of the present specification.

FIG. 3 is diagram for describing a structure of a subpixel according to the present specification.

Referring to FIG. 3, each subpixel is connected to the gate driver GIC, a scan line SCAN, and a sensing line SENSE, and is connected through the data driver DIC, a data line DATA, and a reference line. The gate line GL illustrated in FIG. 1 may include the scan line SCAN or sensing line SENSE illustrated in FIG. 3. Also, the data line DL illustrated in FIG. 1 may include the data line DATA or reference line illustrated in FIG. 3.

Each subpixel receives a data voltage VDATA from the data driver DIC through a digital analog converter DAC. Also, a sensing voltage VSEN output from each subpixel is provided to the data driver DIC through the analog digital converter ADC. Also, each subpixel is connected to the high potential driving voltage ELVDD and the low potential driving voltage ELVSS.

Each subpixel includes a scan TFT S-TFT, a driving TFT D-TFT, and a sensing TFT SS-TFT. Also, each subpixel includes a storage capacitor CST and a light emitting device (OLED).

A first electrode (e.g., a source electrode) of the scan transistor S-TFT is connected to the data lines DATA, and the data voltage VDATA is output from the data driver DIC and is applied to the data line through the digital analog converter DAC. A second electrode (e.g., a drain electrode) of the scan transistor S-TFT is connected to one end of the storage capacitor CST and is connected to a gate electrode of the driving TFT D-TFT. The gate electrode of the scan transistor S-TFT is connected to the scan line SCAN. That is, the scan transistor S-TFT is turned on when the gate signal at a gate-on level is applied through the scan line SCAN, so that the data signal VDATA applied through the data line DATA is transferred to one end of the storage capacitor CST.

One end of the storage capacitor CST is connected to a third electrode (e.g., a drain electrode) of the scan TFT S-TFT, and may receive the data voltage VDATA. The other end of the storage capacitor CST may be connected to the source electrode of the driving TFT D-TFT. Also, the storage capacitor CST may charge a voltage corresponding to a difference between the voltage applied to one end thereof and the reference voltage VREF applied to the other end thereof through a switch SPRE and the sensing TFT SS-TFT.

A first electrode (e.g., a source electrode) of the driving transistor D-TFT is configured to receive the high potential driving voltage ELVDD, and a second electrode (e.g., a drain electrode) is connected to a first electrode (e.g., an anode electrode) of the light emitting device (OLED). A third electrode (e.g., a gate electrode) of the driving transistor D-TFT is connected to one end of the storage capacitor CST. The driving transistor D-TFT is turned on when a voltage at the gate-on level is applied, and may control an amount of a driving current flowing through the light emitting device (OLED) in response to a voltage provided to the gate electrode. That is, the current is determined by a voltage difference between the gate-source voltages Vgs of the driving TFT D-TFT (or a storage voltage difference in the storage capacitor CST) and is applied to the light emitting element (OLED).

A first electrode (e.g., a source electrode) of the sensing TFT SS-TFT is connected to the reference line REFERENCE, and a second electrode (e.g., a drain electrode) is connected to the other end of the storage capacitor CST. A third electrode (e.g., a gate electrode) is connected to the sensing line SENSE. That is, the sensing TFT SS-TFT is turned on by a sensing signal SENSE output from the gate driver GIC and applies the reference voltage VREF to the other end of the storage capacitor CST. If both the switch SPRE and a switch SAM are turned off and the sensing TFT SS-TFT is turned on, the storage voltage of the storage capacitor CST is transferred to the capacitor of the reference line, and the sensing voltage VSEN is stored in the capacitor of the reference line.

If the switch SPRE is turned off and the switch SAM is turned on, the voltage VSEN stored in the reference line capacitor is output to the data driver DIC through the analog digital converter ADC. This output voltage is used soon as a voltage for sensing and sampling the degradation of a corresponding subpixel. That is, a voltage for compensating for a corresponding subpixel may be sensed and sampled.

Specifically, the characteristics of the driving TFT D-TFT are classified into two types of mobility and threshold voltage, and the compensation may be implemented by sensing the mobility and threshold voltage of the driving TFT D-TFT. Hereinafter, each driving method for each type of compensation will be described.

Meanwhile, the light emitting device (OLED) outputs light corresponding to the driving current. The light emitting element (OLED) may output light corresponding to any one of red, white, green, and blue colors. The light emitting device (OLED) may be an organic light emitting diode (OLED) or a micro inorganic light emitting diode having a size in a range from micro scale to nano scale. However, the present disclosure is not limited thereto. Hereinafter, the technical spirit of the present disclosure will be described with reference to the embodiment in which the light emitting device (OLED) is composed of the organic light emitting diode.

FIG. 3 illustrates an example in which a switching transistor S-TFT, the driving transistor D-TFT, and the sensing transistor SS-TFT are NMOS transistors, but the present disclosure is not limited thereto. For example, at least some or all of the transistors constituting each subpixel may be composed of a PMOS transistor. In various embodiments, each of the switching transistor and the driving transistor may be implemented with a low temperature poly silicon (LTPS) thin film transistor, an oxide thin film transistor, or a low temperature polycrystalline oxide (LTPO) thin film transistor.

In addition, in the description with reference to FIG. 3, it is illustrated that four subpixels share one reference line REFERENCE. However, the present disclosure is not limited thereto. A multiple number of subpixels may share one reference line REFERENCE, or each subpixel may be connected to one reference line REFERENCE. In the present specification, for convenience of description, as illustrated in FIG. 3, it is described that four subpixels share one reference line REFERENCE, and it should be construed as an example.

Figure 4A:
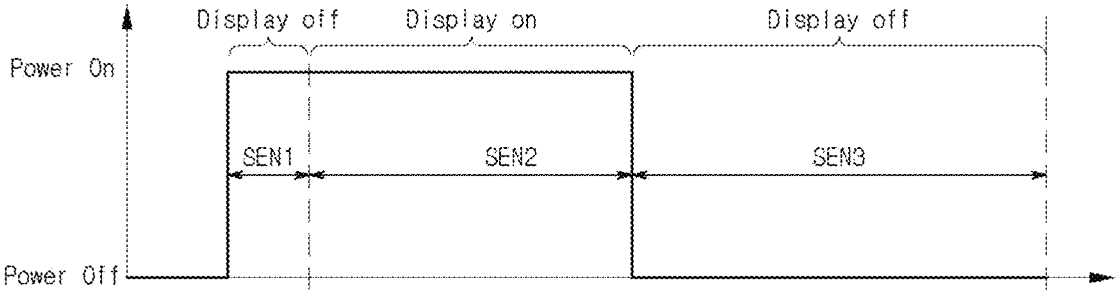
FIG. 4A is a diagram for describing types of sensing according to a comparative example.

FIG. 4A is a diagram for describing types of sensing according to a comparative example.

Referring to FIG. 4A, a first sensing SEN1 may be performed after the display apparatus is powered on and before the display is turned on. That is, the first sensing SEN1 is sensing performed in a state in which the display is turned off after the display apparatus is powered on. Such first sensing SEN1 may be referred to as 'power-on mobility sensing'. In one embodiment, the first sensing SEN1 is performed during a first mobility sensing period responsive to the display apparatus being turned off but the display panel being off.

The powering on the display apparatus means that power is applied to the display apparatus from the outside and applied to a control PCB (see C-PCB in FIG. 2) disposed inside the display apparatus. The turning on the display means that a data voltage (see VDATA in FIG. 2) is applied to the subpixel from the data driver (see SIC in FIG. 2). Therefore, the first sensing SEN1 may be performed during a short time of several seconds after the display apparatus is powered on and before the timing controller, the gate driver, and the data driver start operating.

A subject (e.g., a target) to be sensed by the first sensing SEN1 is the mobility of the driving transistor D-TFT. The sensing the mobility of the driving transistor D-TFT uses a method of operating the driving transistor D-TFT as a constant current source as will be described later with reference to FIGS. 6A to 6D and FIGS. 7A to 7E, so that the time for sensing one subpixel is very short. Therefore, the time for required to sense all subpixels of the display apparatus is about 2 to 4 seconds depending on the type (size) of the display apparatus. Accordingly, the first sensing SEN1 may be performed after the display apparatus is powered on and before the display is turned on (i.e., while the display is turned off).

Referring again to FIG. 4A, a second sensing SEN2 may be performed after the display apparatus is powered on, and while the display is turned on. That is, the second sensing SEN2 is sensing performed on one gate line in every frame while an image is displayed. Such second sensing SEN2 may be referred to as 'real-time mobility sensing'. In one embodiment, the second sensing SEN2 is performed during a second mobility sensing period responsive to the display panel being on.

A subject to be sensed by the second sensing SEN2 is the mobility of the driving transistor D-TFT. As described above, the sensing the mobility of the driving transistor takes a very short time to sense one subpixel. In addition, the second sensing SEN2 should be performed during real time when an image is displayed. Accordingly, the second sensing SEN2 may be performed only on the subpixels disposed on one gate line during a period between frames of image data (i.e., a vertical blank period). A vertical blank period during which the second sensing SNE2 is performed may be about 300 us. Like the first sensing SEN1, the second sensing SEN2 may use a method of operating the driving transistor as a constant current source.

Referring again to FIG. 4A, a third sensing SEN3 may be performed after the display apparatus is powered off, and while the display is turned off. More specifically, if a user turns off the power of a display apparatus such as a TV through a remote control, the display may be turned off, but the control PCB may be controlled to maintain power application. The timing controller TCON, memory MEM, and power block PB (see FIGS. 1 and 2) disposed on the control PCB may perform the third sensing SEN3 through applied power. The third sensing SEN3 may be referred to as 'power-off threshold voltage sensing'.

A subject to be sensed by the third sensing SEN3 is the threshold voltage Vth of the driving transistor D-TFT. In order to sense the threshold voltage of the driving transistor D-TFT, it is generally required to drive the driving transistor D-TFT in a source follower manner to saturate the driving transistor D-TFT. The degradation of the driving transistor D-TFT may be sensed by sampling the voltage applied to the source electrode of the driving transistor D-TFT after the driving transistor D-TFT is saturated. As will be described later with reference to FIGS. 7A to 7D, a corresponding time is required to saturate the driving transistor D-TFT. Therefore, the time required to sense the threshold voltage of the driving transistor D-TFT is relatively long. Accordingly, unlike the first sensing SEN1 or second sensing SEN2 that requires a short time, the sensing the threshold voltage of the driving transistor D-TFT is performed after the user powers off the display device according to one embodiment. The time required to sense all subpixels of the display device is different depending on the type (size) of the display apparatus, but is generally 300 seconds or more.

Figure 4B:
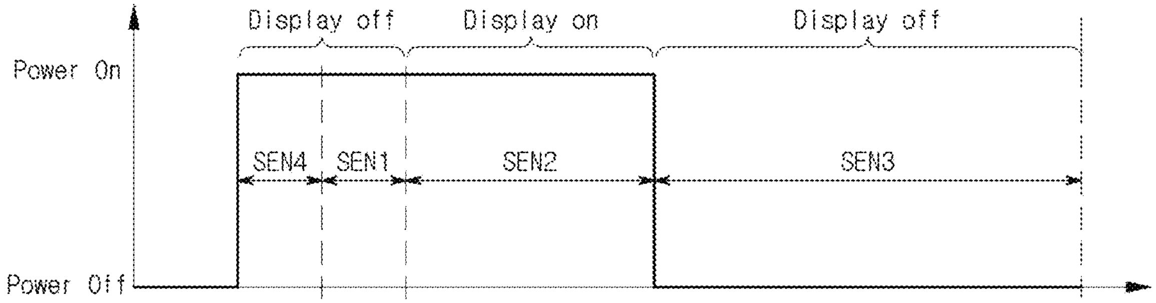
FIG. 4B is a diagram for describing types of compensation according to an embodiment of the present specification.

FIG. 4B is a diagram for describing types of compensation according to an embodiment of the present specification.

The first sensing SEN1, the second sensing SEN2, and the third sensing SEN3 illustrated in FIG. 4B are the same as those described above with reference to FIG. 4A.

Referring to FIG. 4B, a fourth sensing SEN4 may be performed after the display apparatus is powered on and before the display is turned on. That is, the fourth sensing SEN4 is sensing performed in a state in which the display is still off after the display apparatus is powered on. In one embodiment, the fourth sensing SEN4 is performed during a first threshold voltage sensing period responsive to the display apparatus being turned off but the display panel being off. A time point at which the fourth sensing SEN4 is performed is the same as a time point at which the first sensing SEN1 is performed in FIG. 4A. However, the fourth sensing SEN4 senses the threshold voltage of the driving transistor and may be distinguished from the first sensing SEN1 sensing the mobility of the driving transistor. The fourth sensing SEN4 is identical to the third sensing SEN3 in that it senses the threshold voltage of the driving transistor. However, the fourth sensing SEN4 may be distinguished from the third sensing SEN3 in that it is performed at a higher speed. Also, the fourth sensing SEN4 may be distinguished from the third sensing SEN3 in that the third sensing SEN3 is performed after power-off and the fourth sensing SEN4 is performed after power-on. That is, since the fourth sensing SEN4 may be performed at high speed, the fourth sensing SEN4 may be performed after the display apparatus is powered on but before the display is turned on. The fourth sensing SEN4 may be referred to as 'power-on high-speed threshold voltage sensing'.

Meanwhile, although the fourth sensing SEN4 is illustrated as being performed before the first sensing SEN1, the first sensing SEN1 may be performed first and the fourth sensing SEN4 may be performed thereafter. Also, the fourth sensing SEN4 may be omitted according to a user's selection. In one embodiment, the first mobility sensing period during which the first sensing SEN1 is performed is after the first threshold voltage sensing period during which the fourth sensing SEN4 is performed, the second mobility sensing period during which the second sensing SEN2 is performed is after the first mobility sensing period, and the second threshold voltage sensing period during which the third sensing SEN3 is performed is after the second mobility sensing period A subject (e.g., a target) to be sensed by the fourth sensing SEN4 is the threshold voltage of the driving transistor D-TFT. While the fourth sensing SEN4 is performed to sense the threshold voltage of the driving transistor D-TFT, the driving transistor D-TFT is driven in a source follower manner. In the third sensing SEN3 compared to the fourth sensing SEN4, sampling is performed after the driving transistor D-TFT is saturated. That is, sampling is performed during the fourth sensing after the threshold voltage of the driving transistor D-TFT saturates. In the fourth sensing SEN4, sampling is performed before the driving transistor is saturated. That is, in the fourth sensing SEN4, sampling is performed before the threshold voltage of the driving transistor D-TFT saturates. According to the fourth sensing SEN4, sampling is performed before the time required for the driving transistor D-TFT to be saturated, so that high-speed sensing is possible compared to the third sensing SEN3. The time required for the fourth sensing SEN4 is 2 to 20 seconds and may be adjusted according to various embodiments of the present specification. Compared to 330 seconds, which is the time required for the third sensing SEN3, the time required for the fourth sensing SEN4 may be drastically reduced. A detailed operation of the fourth sensing SEN4 according to the present specification will be described later with reference to FIGS. 8A to 8D.

Meanwhile, according to the present specification, in the case of the fourth sensing SEN4, deterioration in sensing accuracy that may occur due to sampling being performed before the driving transistor is saturated may be resolved by referring to a lookup table. This will be described later with reference to FIG. 9.

Meanwhile, according to the present specification, in performing the fourth sensing SEN4, instead of sensing the subpixels of all gate lines, only subpixels of some gate lines may be sensed, and subpixels of some gate lines may not be sensed. The sensed values of subpixels of the gate line that are not sensed may be estimated based on the sensed values of subpixels of the gate line that is sensed. This will be described later with reference to FIG. 10.

Meanwhile, according to the present specification, the fourth sensing SEN4 may be selectively omitted. For example, when the non-use period of the display apparatus is less than a preset value, the fourth sensing SEN4 may be omitted. Alternatively, whether to activate the fourth sensing SEN4 may be determined according to the user's input. This will be described later with reference to FIG. 11.

FIGS. 5A to 5D are diagrams for describing the first sensing SEN1 of the display apparatus.

As described with reference to FIGS. 4A and 4B, the first sensing SEN1 is performed after the display apparatus is powered on but before the display is turned on. The first sensing SEN1 may sense the mobility of the driving transistor D-TFT. The first sensing SEN1 may be referred to as 'power-on mobility sensing'.

Figure 5A:
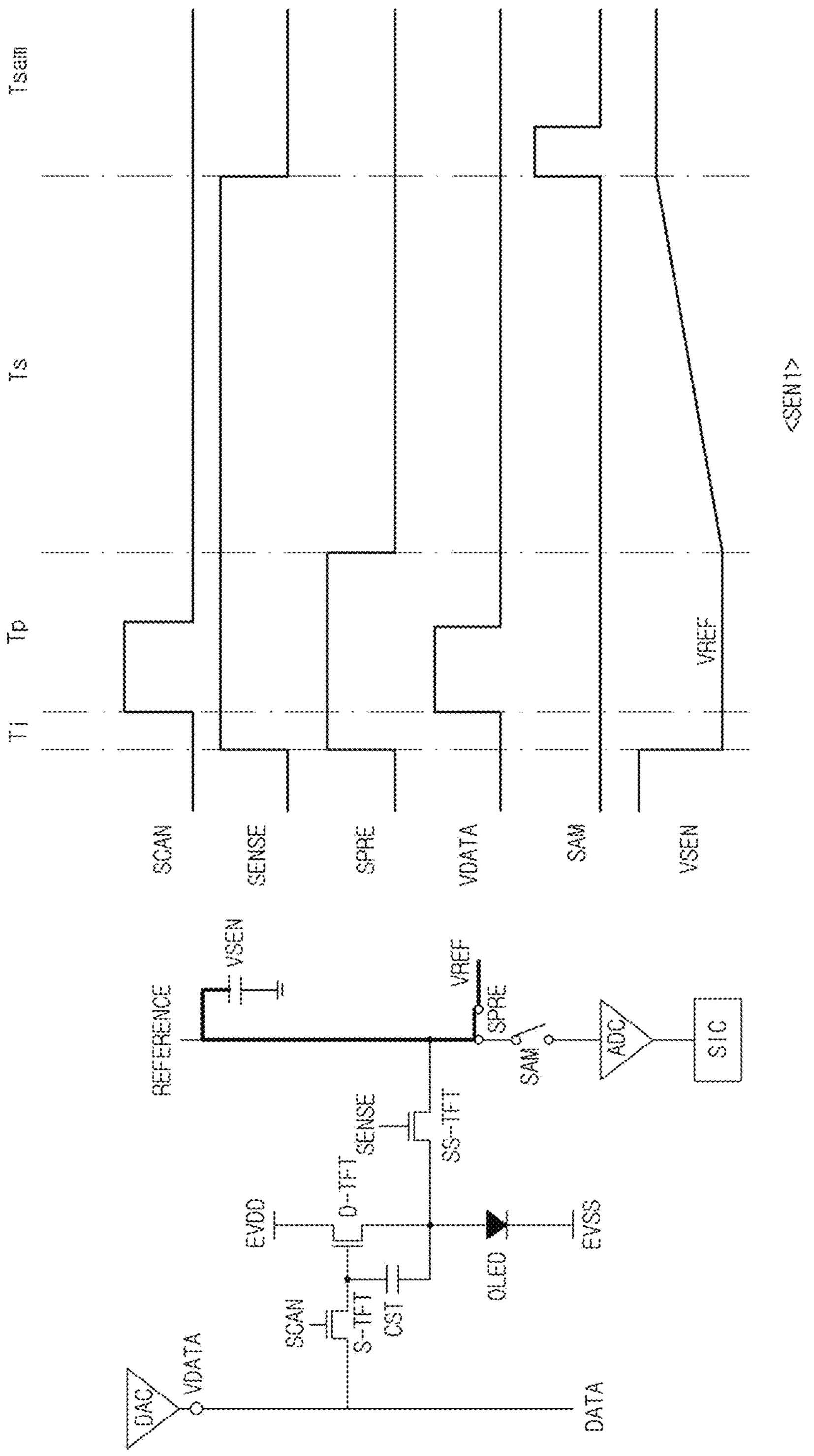
FIGS. 5A to 5D are diagrams for describing a first sensing SEN1 of a display apparatus according to one embodiment of the present specification.

Referring to FIG. 5A, the switch SPRE is turned on in an initialization period Ti. Accordingly, the sensing voltage VSEN stored in the capacitor of the reference line REFERENCE is equal to the reference voltage VREF.

Figure 5B:
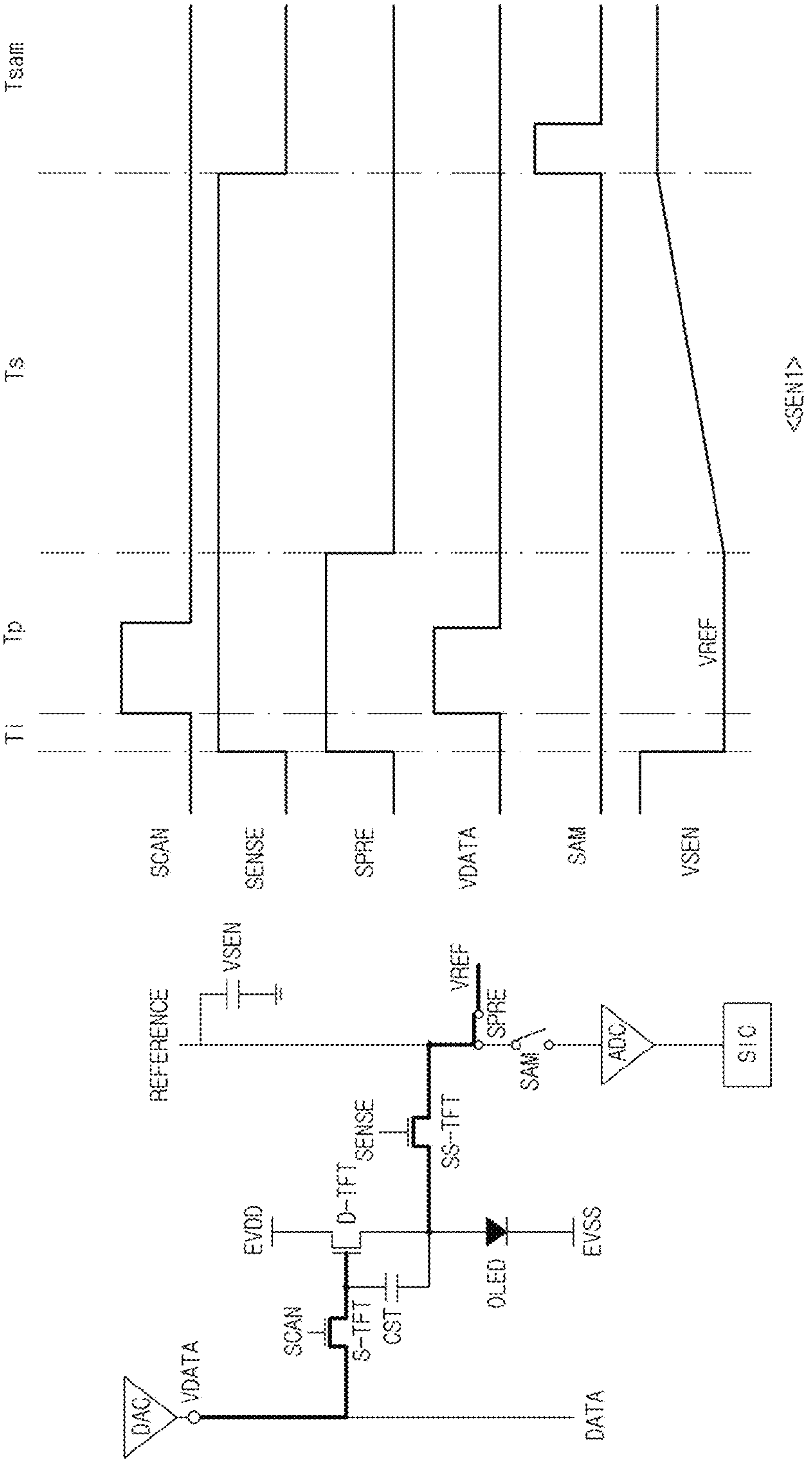

Referring to FIG. 5B, the scan TFT S-TFT is turned on in a programming period Tp. Also, the data voltage VDATA is a high voltage. Accordingly, a charge corresponding to the data voltage VDATA is charged at one end of the storage capacitor CST. Also, in the programming period Tp, the sensing TFT SS-TFT is turned on and the switch SPRE is turned on. Accordingly, the other end of the storage capacitor CST is charged with a charge corresponding to the reference voltage VREF. That is, the voltage across the storage capacitor CST corresponds to a difference between the data voltage VDATA and the reference voltage VREF. Meanwhile, since the switch SPRE is maintained to be turned on, the sensing voltage VSEN is maintained as the reference voltage VREF.

Figure 5C:
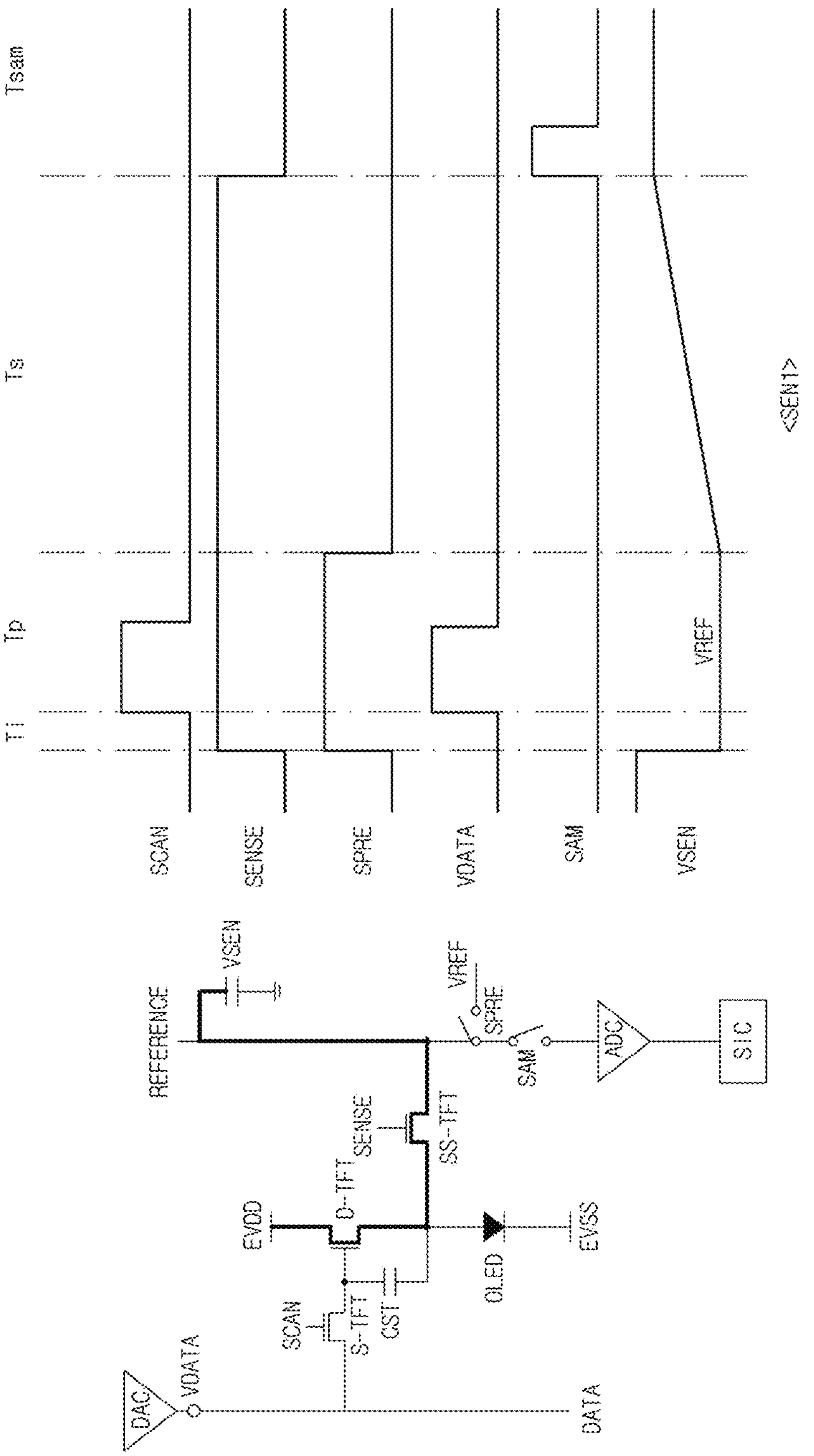

Referring to FIG. 5C, in a sensing period Ts, the scan TFT S-TFT is turned off and the sensing TFT SS-TFT is turned on. Accordingly, the driving TFT D-TFT operates like a constant current source with a constant magnitude, and the current is applied to a capacitor of the reference line REFERENCE through the sensing TFT SS-TFT. Accordingly, the sensing voltage VSEN increases with a constant voltage increase over time.

Figure 5D:
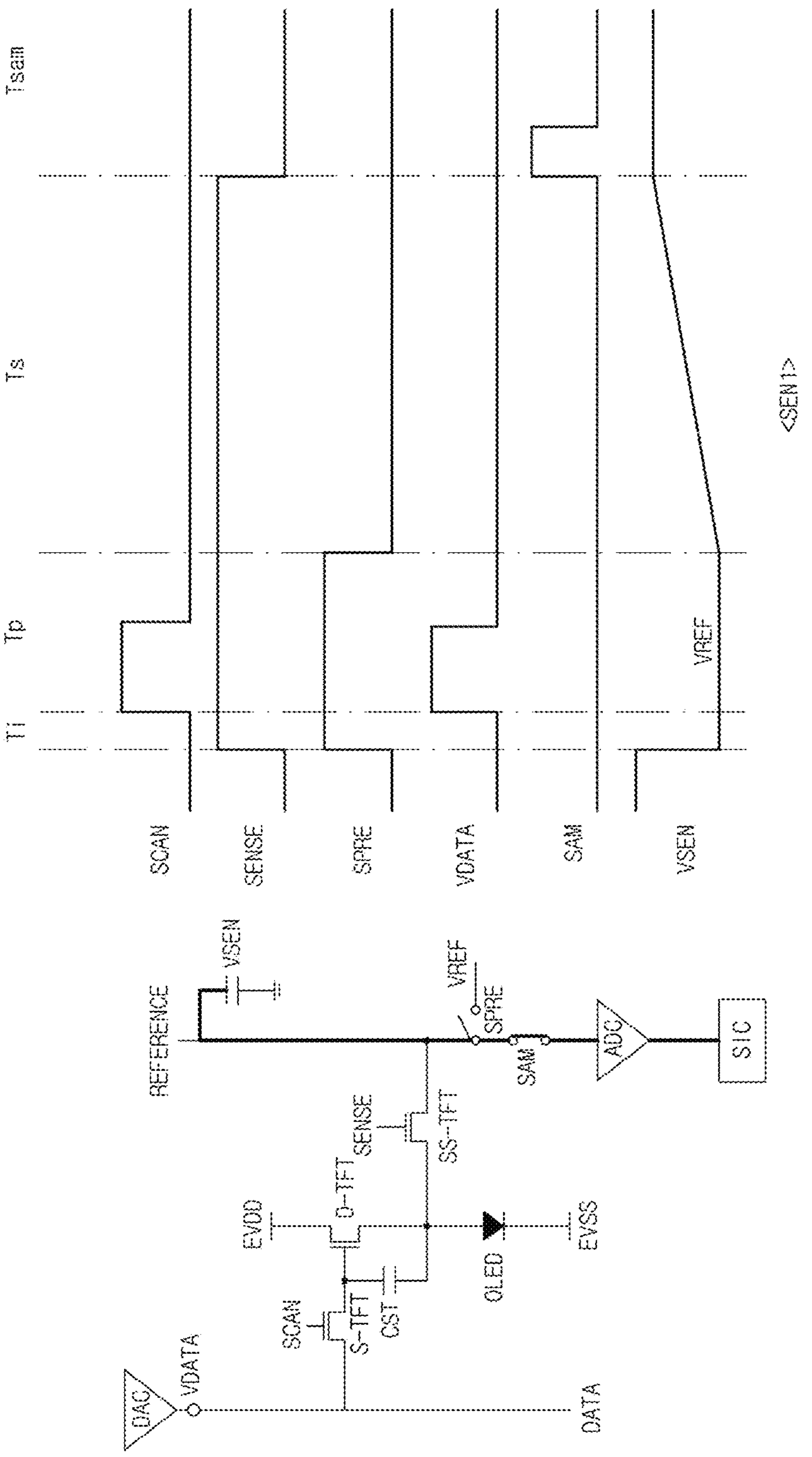

Referring to FIG. 5D, in the sampling period Ts, the sensing TFT SS-TFT is turned off and the switch SAM is turned on. Accordingly, the sensing voltage VSEN is applied to the data driver SIC via the ADC through the reference line REFERENCE. The data driver SIC to which the sensing voltage VSEN is applied may sense the mobility of the driving TFT.

FIGS. 6A to 6E are diagrams for describing a second sensing SEN2 of a display apparatus.

As described with reference to FIGS. 4A and 4B, the second sensing SEN2 is performed on one gate line every frame after the display apparatus is powered on, and while the display is turned on. The second sensing SEN2 may sense the mobility of the driving transistor D-TFT. The second sensing SEN2 may be referred to as 'real-time mobility sensing'.

The second sensing SEN2 may be performed in a vertical blank period between one frame and the next frame. Also, since four subpixels share one reference line, the sensing of the four subpixels may not be simultaneously performed. Also, it is preferable that subpixels having one color among the subpixels connected to a certain gate line are sensed in a certain blank period and subpixels having other colors among the subpixels connected to the gate line are sensed in the next blank period. This is because all the subpixels connected to the gate line cannot be sensed since the blank period is short.

Figure 6A:
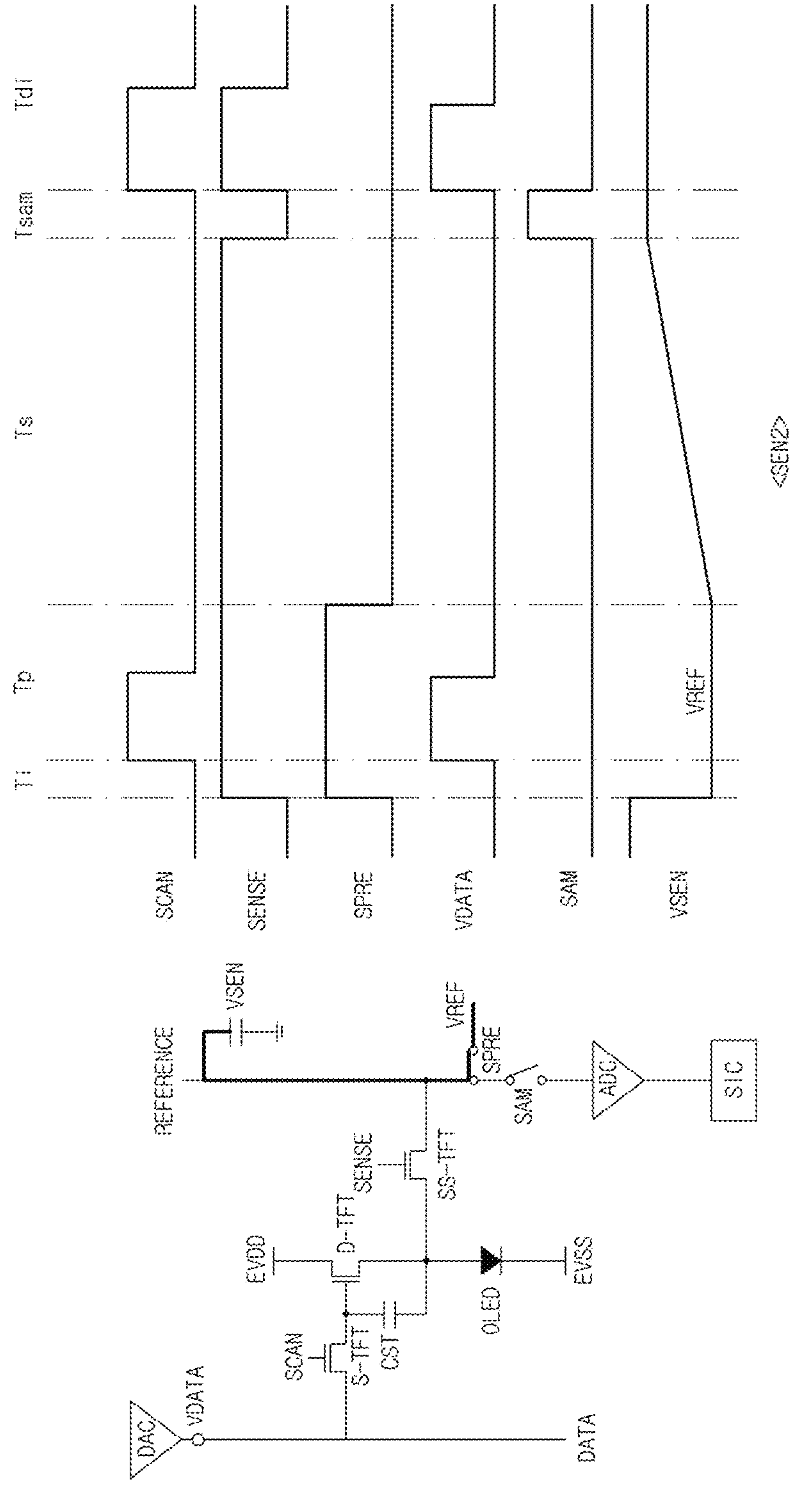
FIGS. 6A to 6E are diagrams for describing a second sensing SEN2 of a display apparatus according to one embodiment of the present specification.

Referring to FIG. 6A, the switch SPRE is turned on in the initialization period Ti. Accordingly, the sensing voltage VSEN stored in the capacitor of the reference line REFERENCE is equal to the reference voltage VREF.

Figure 6B:
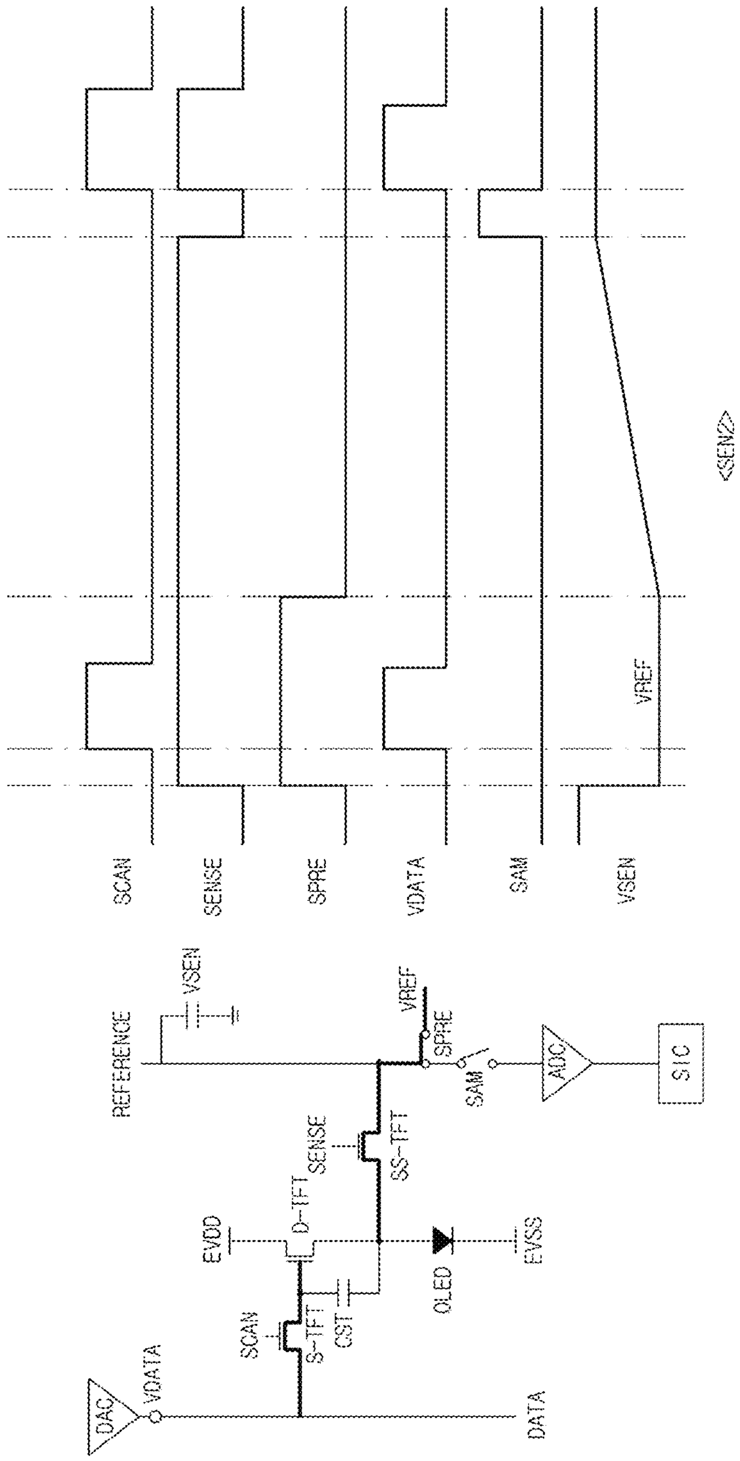

Referring to FIG. 6B, the scan TFT S-TFT is turned on in a programming period Tp. Also, the data voltage VDATA is a high voltage. Accordingly, a charge corresponding to the data voltage VDATA is charged at one end of the storage capacitor CST. Also, in the programming period Tp, the sensing TFT SS-TFT is turned on and the switch SPRE is turned on. Accordingly, the other end of the storage capacitor CST is charged with a charge corresponding to the reference voltage VREF. That is, the voltage across the storage capacitor CST corresponds to a difference between the data voltage VDATA and the reference voltage VREF. Meanwhile, since the switch SPRE is maintained to be turned on, the sensing voltage VSEN is maintained as the reference voltage VREF.

Figure 6C:
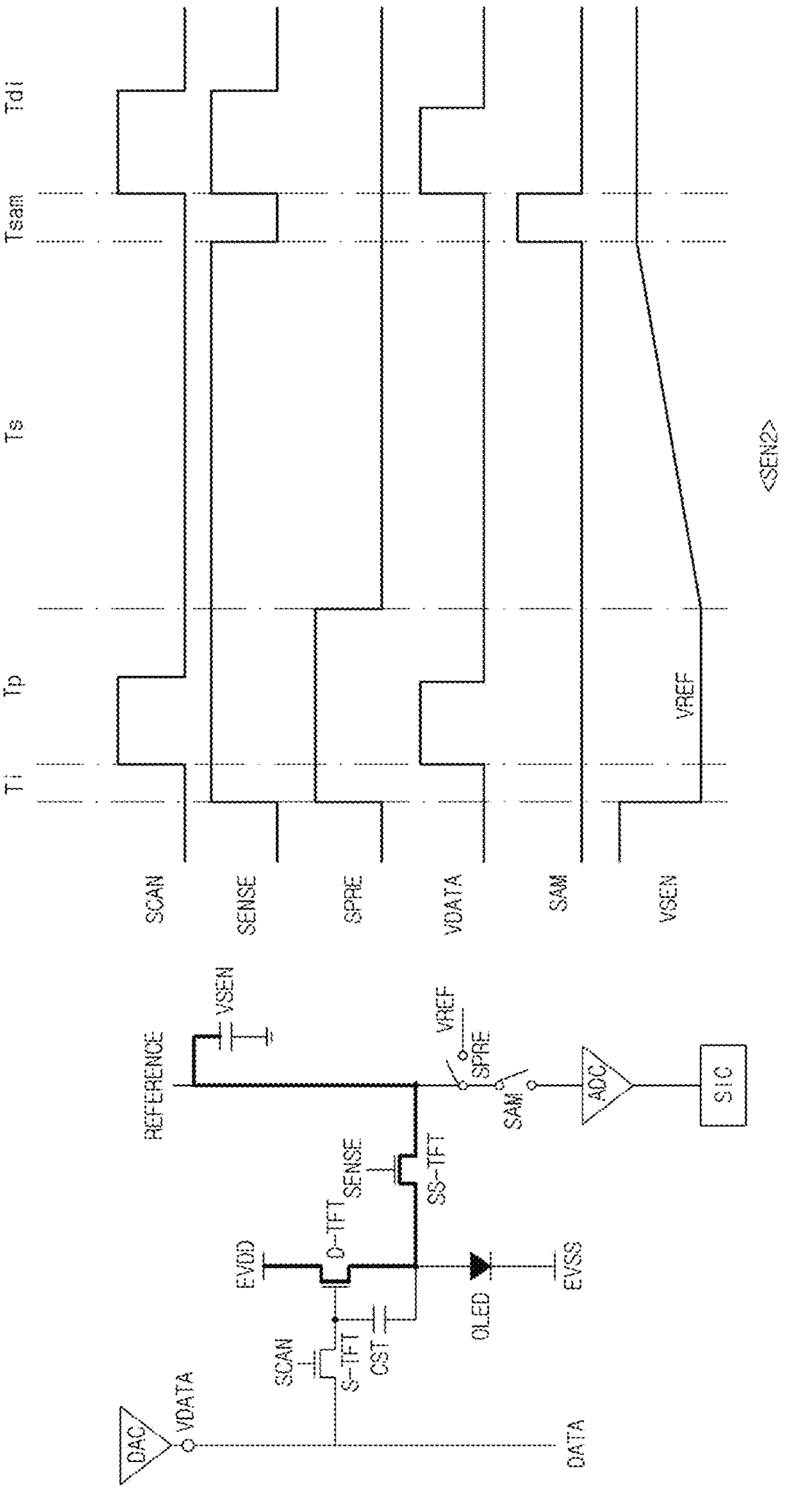

Referring to FIG. 6C, in the sensing period Ts, the scan TFT S-TFT is turned off and the sensing TFT SS-TFT is turned on. Accordingly, the driving TFT D-TFT operates like a constant current source with a constant magnitude, and the current is applied to the capacitor of the reference line REFERENCE through the sensing TFT SS-TFT. Accordingly, the sensing voltage VSEN increases with a constant voltage increase over time.

Figure 6D:
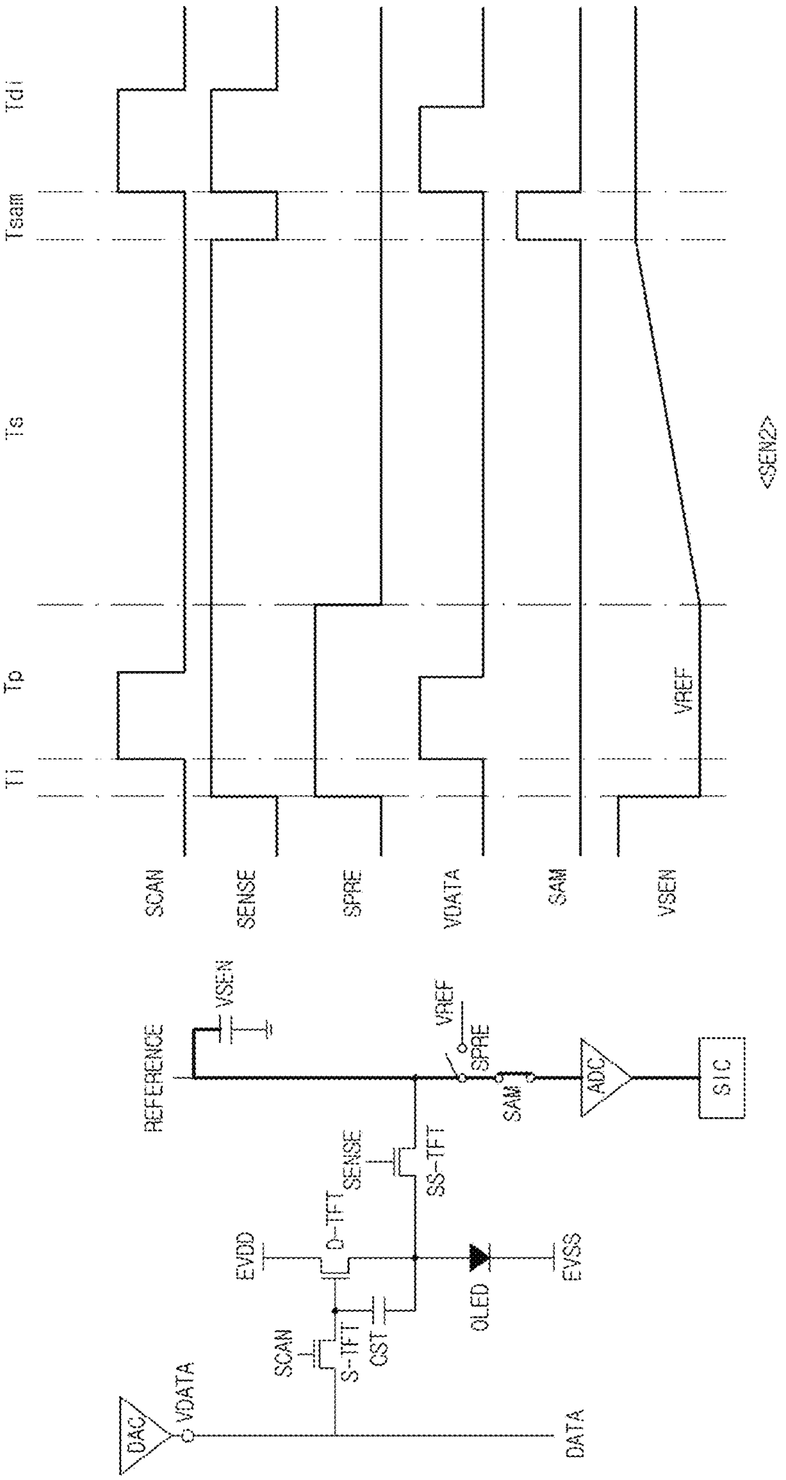

Referring to FIG. 6D, in the sampling period Tsam, the sensing TFT SS-TFT is turned off and the switch SAM is turned on. Accordingly, the sensing voltage VSEN is applied to the data driver SIC via the ADC through the reference line REFERENCE. The data driver SIC) to which the sensing voltage VSEN is applied may sense the mobility of the driving TFT.

Figure 6E:
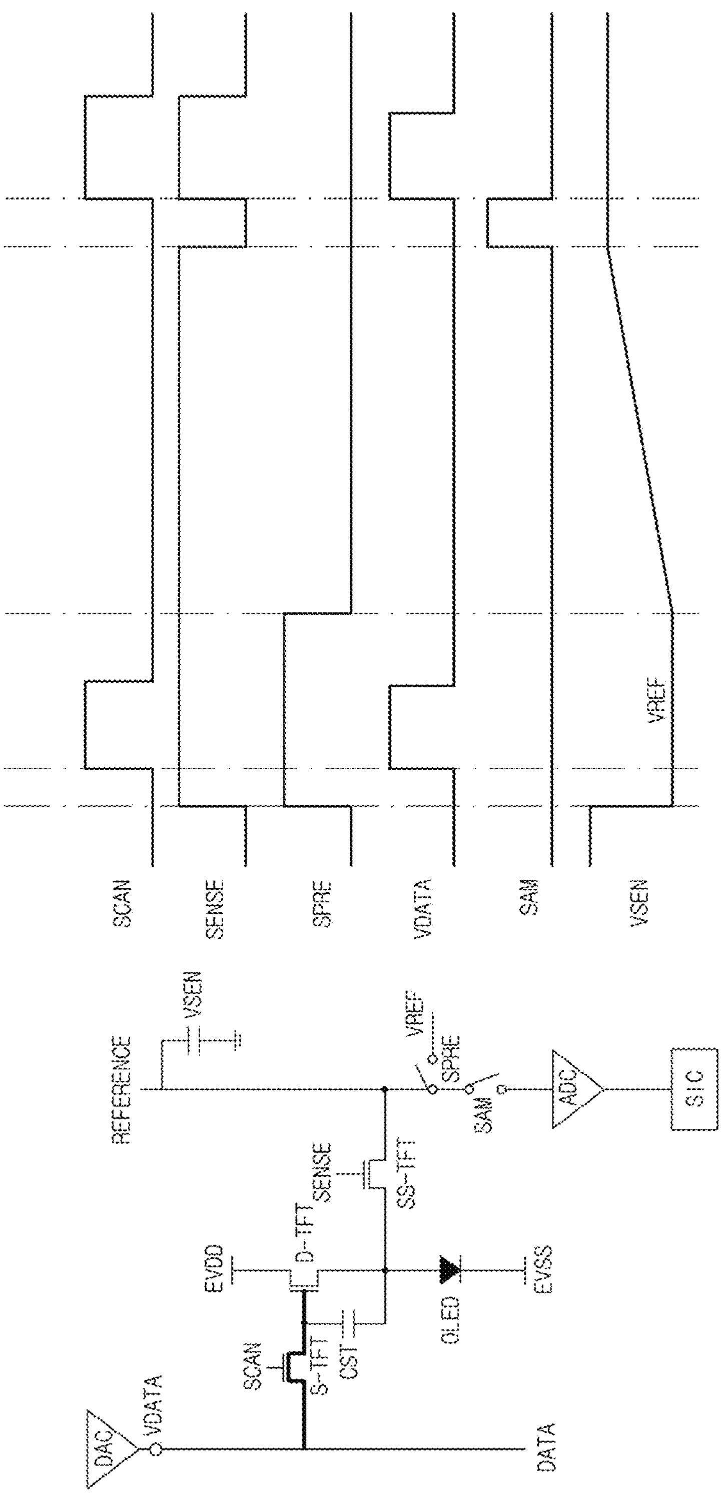

Meanwhile, referring to FIG. 6E, in a data insertion period Tdi after the sampling period Tsam, the scan TFT S-TFT is turned on and the data voltage VDATA is a high voltage. That is, since a real-time compensation is performed, the process in FIGS. 6A to 6D is performed during the blank period between frame and frame. A luminance deviation from another data line charged with an existing data voltage occurs. In order to correct the luminance deviation, the data of the previous frame is restored in the data insertion period Tdi after the sampling period.

FIGS. 7A to 7D are diagrams for describing a third sensing SEN3 of a display apparatus.

As described with reference to FIGS. 4A and 4B, the third sensing SEN3 is performed after the display apparatus is powered off and while the display is turned off. The third sensing SEN3 may sense the threshold voltage of the driving transistor D-TFT. The third sensing SEN3 may be referred to as 'power-off threshold voltage sensing'.

Specifically, the third sensing SEN3 may be performed in a state where a black screen is displayed even though the user turns off the power of the display apparatus since the power is maintained on the control PCB of the display apparatus without being turned off. Since the four subpixels share one reference line, sensing of the four subpixels is not performed simultaneously. Since four subpixels share one reference line, sensing of the four subpixels may not be simultaneously performed in one embodiment. Accordingly, subpixels having one color among the subpixels connected to a certain gate line are sensed, and then, subpixels having other colors may be sensed. It is preferable to sense the next gate line after sensing all subpixels of a corresponding gate line. This is because, unlike real-time sensing, it is free from time constraints.

Figure 7A:
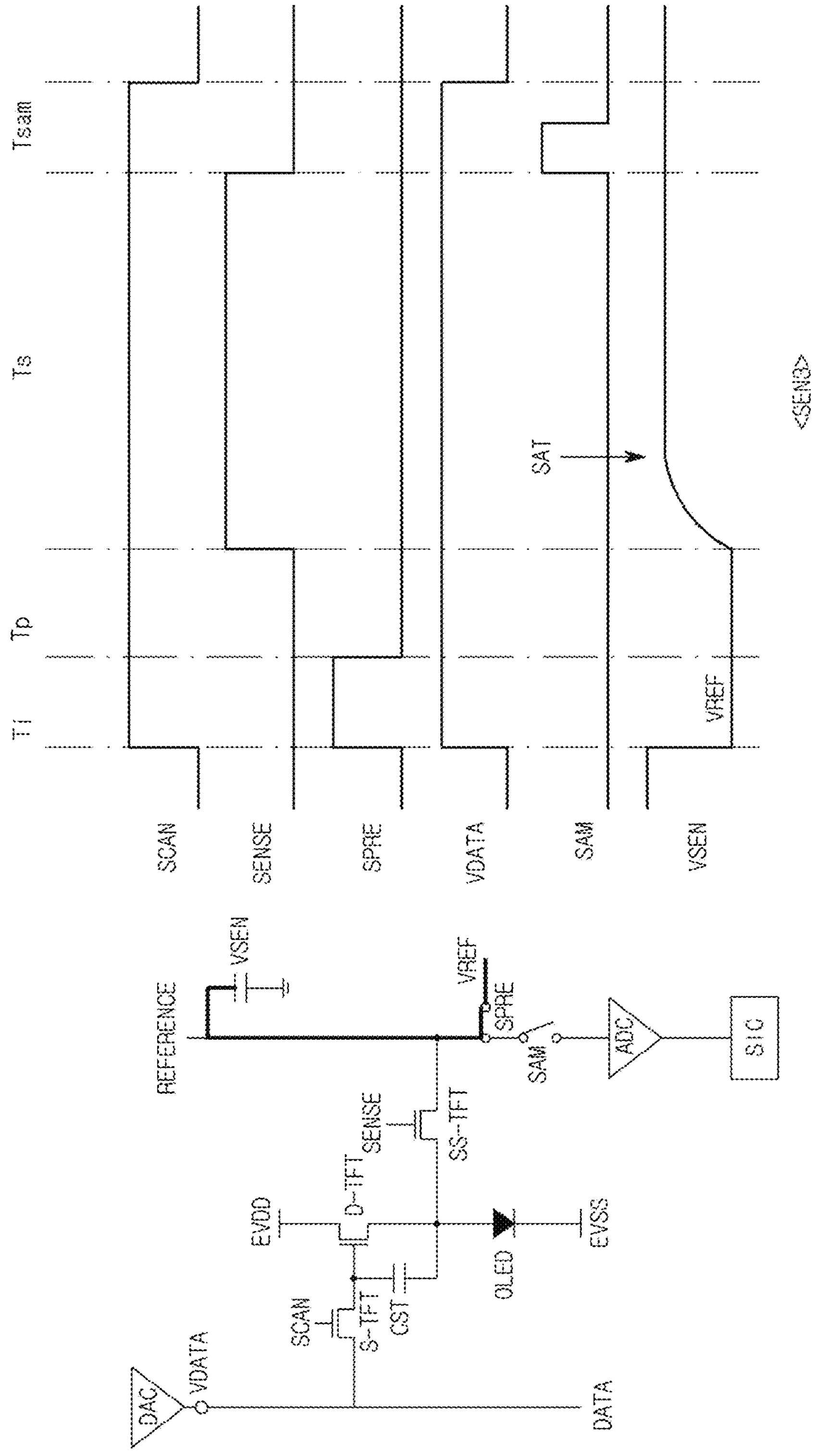
FIGS. 7A to 7D are diagrams for describing a third sensing SEN3 of a display apparatus according to one embodiment of the present specification.

Referring to FIG. 7A, the switch SPRE is turned on in the initialization period Ti. Accordingly, the sensing voltage VSEN stored in the capacitor of the reference line REFERENCE is equal to the reference voltage VREF.

Figure 7B:
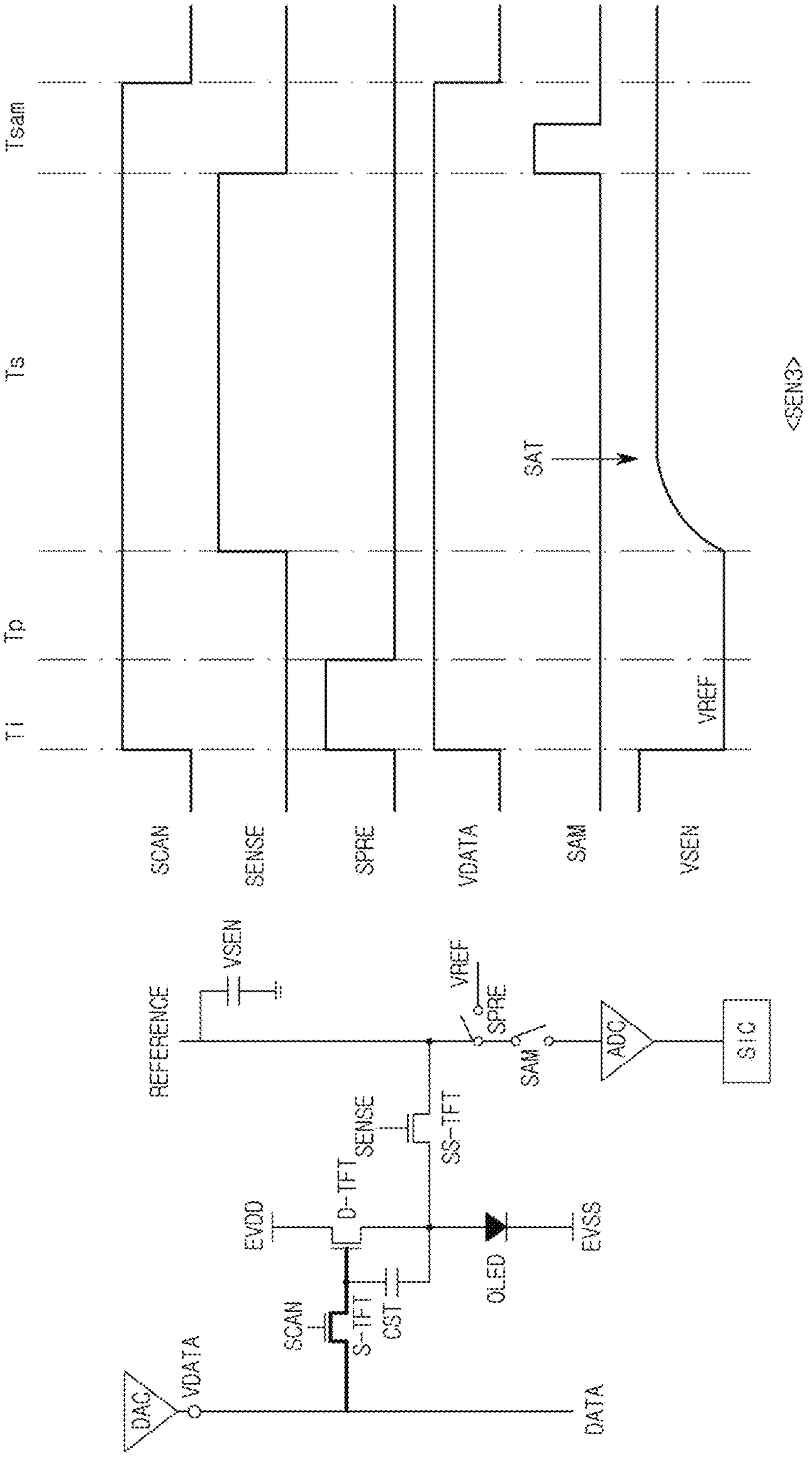

Referring to FIG. 7B, the scan TFT (S-TFT) is turned on in a programming period Tp. Also, the data voltage VDATA is a high voltage. Accordingly, a charge corresponding to the data voltage VDATA is charged at one end of the storage capacitor CST. Also, the other end of the storage capacitor CST is floating. Therefore, due to the capacitor characteristics, the voltage at the other end of the storage capacitor CST increases at the same rate as that at which the voltage at one end of the storage capacitor CST increases.

Figure 7C:
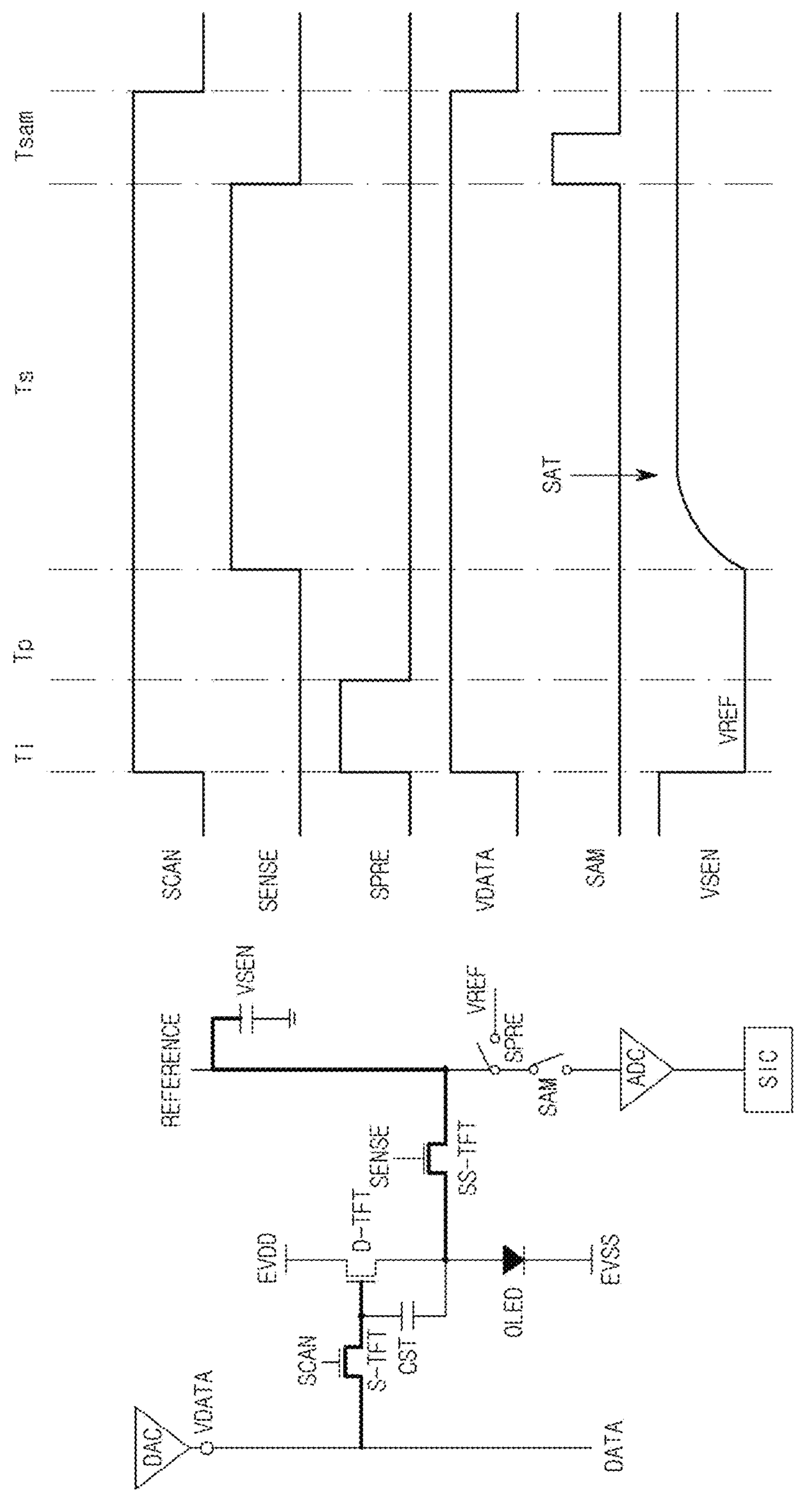

Referring to FIG. 7C, in the sensing period Ts, the scan TFT S-TFT is maintained to be turned on and the data voltage VDATA is maintained high. Accordingly, a charge corresponding to the data voltage VDATA is continuously charged at one end of the storage capacitor CST. In the sensing period Ts, the sensing TFT SS-TFT is turned on. Accordingly, the sensing voltage VSEN increases in the same way as that in which the voltage at the other end of the storage capacitor CST increases.

Figure 7D:
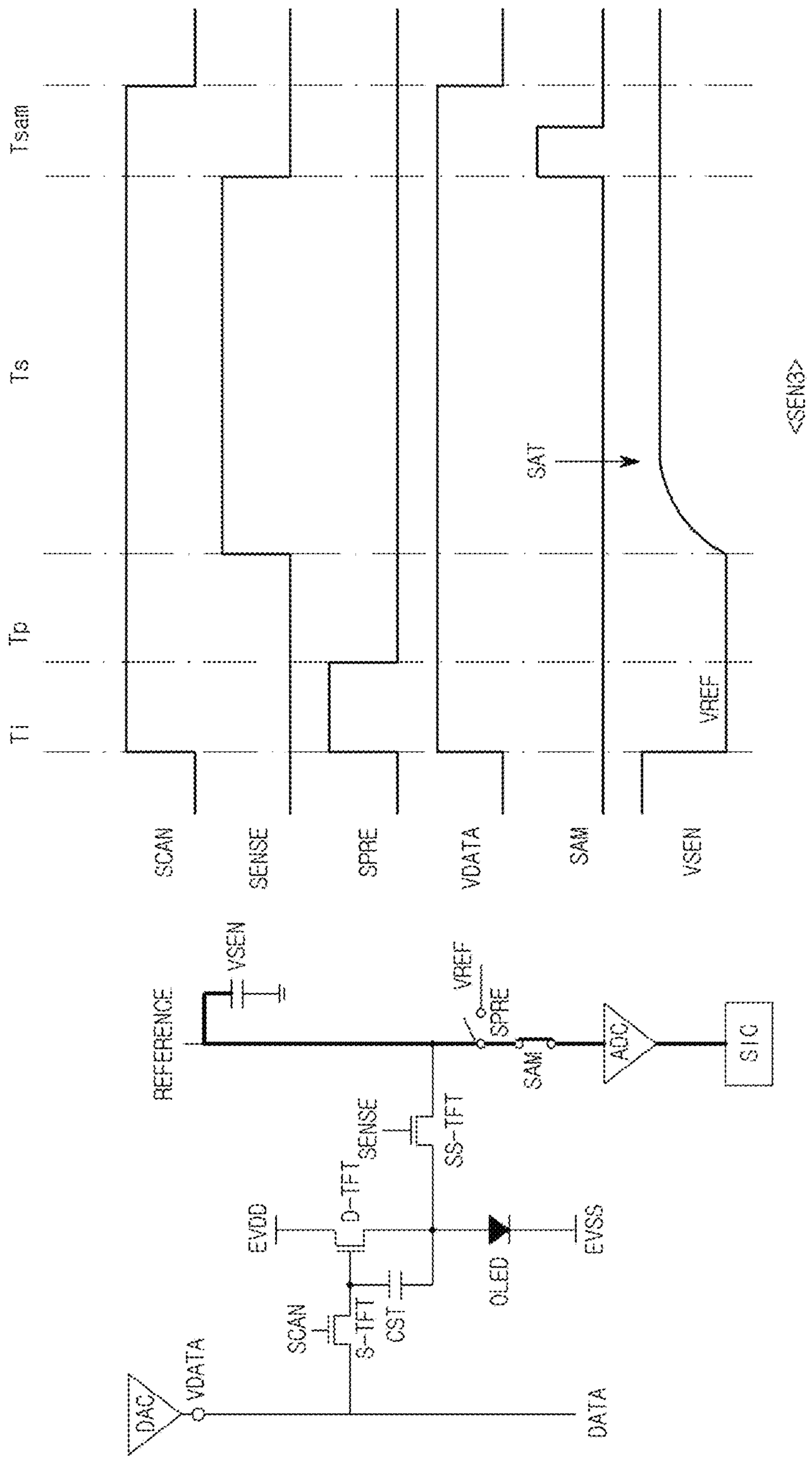

Referring to FIG. 7D, in the sampling period Tsam, the sensing TFT SS-TFT is turned off and the switch SAM is turned on. Accordingly, the sensing voltage VSEN is applied to the data driver SIC via the ADC through the reference line REFERENCE. The data driver SIC to which the sensing voltage VSEN is applied may sense the threshold voltage of the driver TFT D-TFT. A point in time at which the threshold voltage is sampled in the third sensing SEN3 is a point in time after the point in time SAT at which the threshold voltage of the driving transistor D-TFT is saturated. This is different from the fourth sensing SEN4 in that a point in time at which the threshold voltage is sampled in the fourth sensing SEN4 is a point in time SAT before a point in time at which the threshold voltage of the driving transistor D-TFT is saturated.

FIGS. 8A to 8D are diagrams for describing a fourth sensing SEN4 of a display apparatus.

As described with reference to FIGS. 4A and 4B, the fourth sensing SEN4 is performed after the display apparatus is powered on but before the display is turned on. The fourth sensing SEN4 may sense the threshold voltage of the driving transistor D-TFT. The fourth sensing SEN4 may be referred to as 'power-on high-speed threshold voltage sensing'.

Figure 8A:
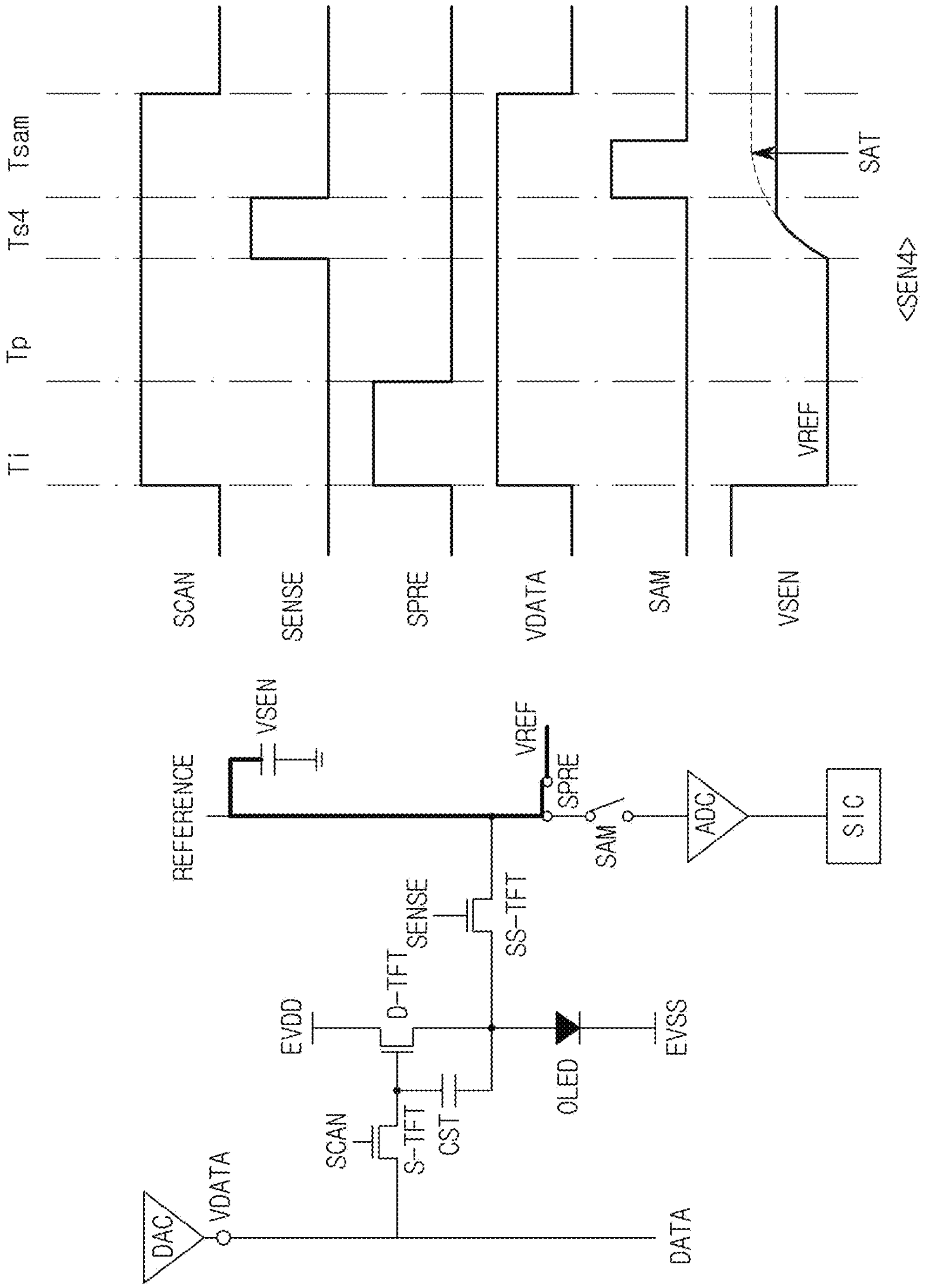
FIGS. 8A to 8D are diagrams for describing a fourth sensing SEN4 of a display apparatus according to one embodiment of the present specification.

Referring to FIG. 8A, the switch SPRE is turned on in the initialization period Ti. Therefore, the sensing voltage VSEN stored in the capacitor of the reference line REFERENCE is equal to the reference voltage VREF.

Figure 8B:
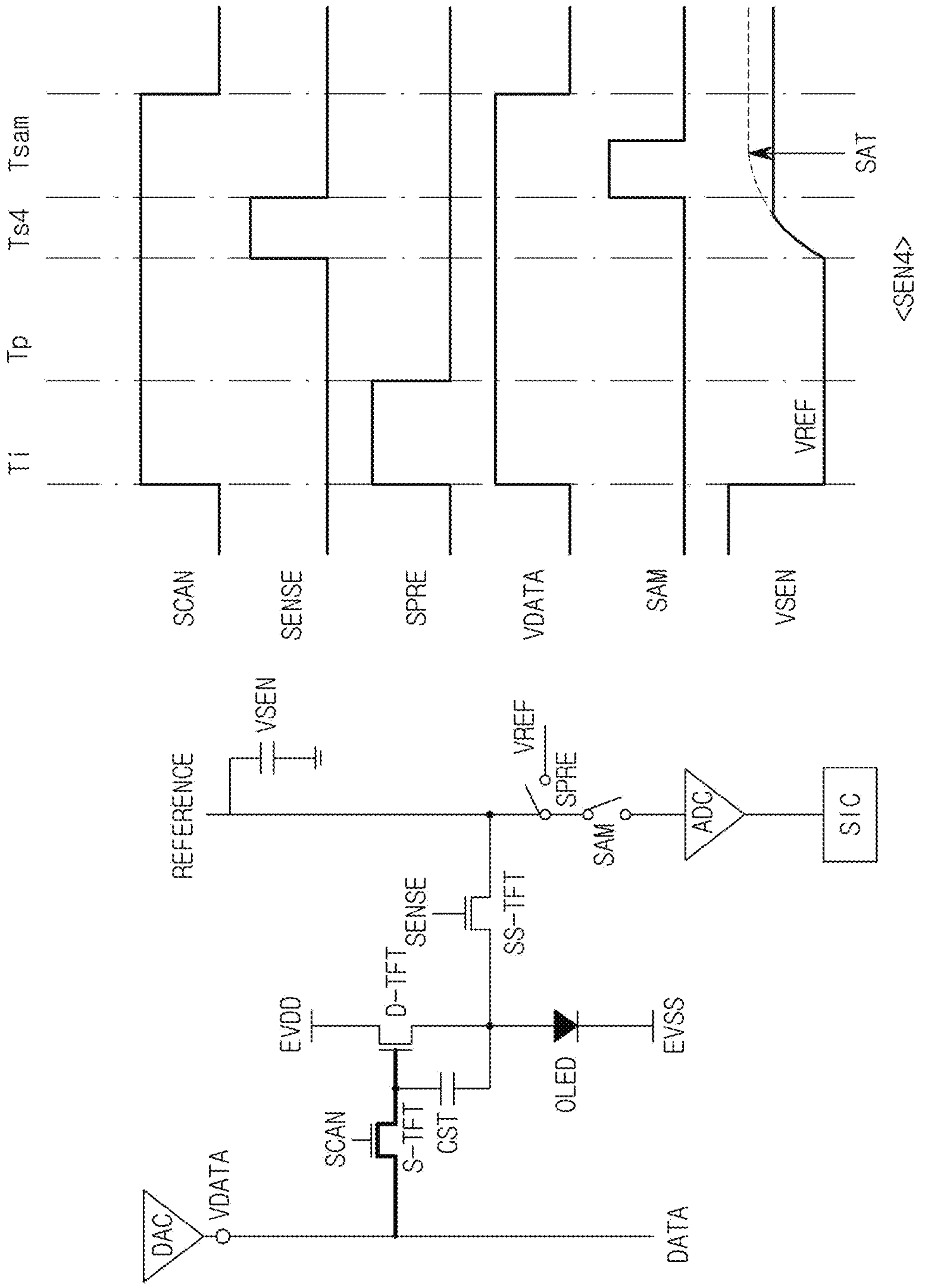

Referring to FIG. 8B, the scan TFT S-TFT is turned on in the programming period Tp. Also, the data voltage VDATA is a high voltage. Accordingly, a charge corresponding to the data voltage VDATA is charged at one end of the storage capacitor CST. Also, the other end of the storage capacitor CST is floating. Therefore, due to the capacitor characteristics, the voltage at the other end of the storage capacitor CST increases at the same rate as that at which the voltage at one end of the storage capacitor CST increases.

Figure 8C:
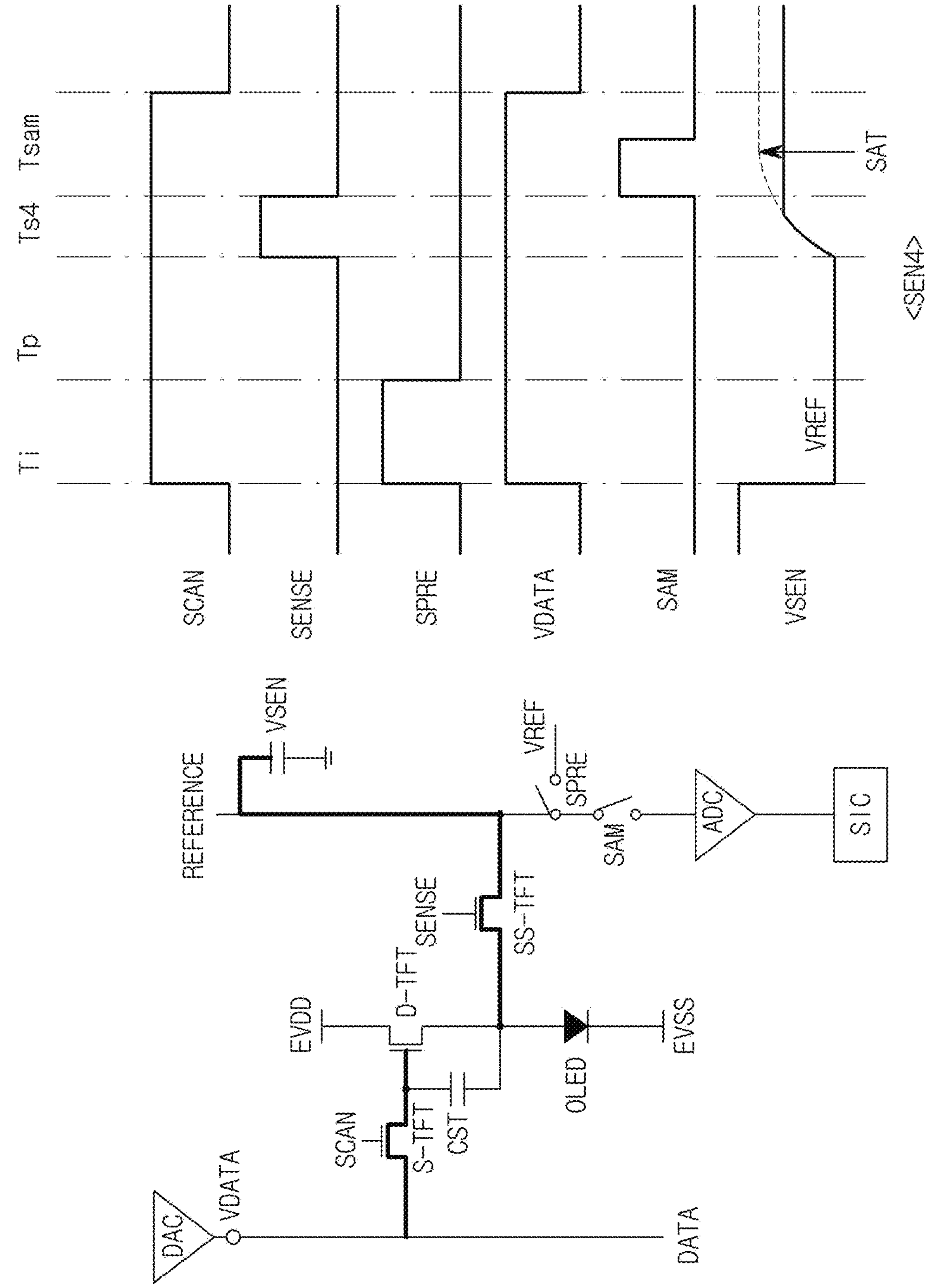

Referring to FIG. 8C, in the sensing period Ts4, the scan TFT S-TFT is maintained to be turned on and the data voltage VDATA is maintained high. Accordingly, a charge corresponding to the data voltage VDATA is continuously charged at one end of the storage capacitor CST. In the sensing period Ts4, the sensing TFT SS-TFT is turned on. Accordingly, the sensing voltage VSEN increases in the same way as that in which the voltage at the other end of the storage capacitor CST increases. The length of the sensing period Ts4 of the fourth sensing SEN4 is shorter than that of the sensing period Ts of the third sensing SEN3. This is because sampling is performed earlier than the point in time SAT at which the threshold voltage of the driving TFT D-TFT is saturated in the fourth sensing SEN4. The third sensing SEN3 and the fourth sensing SEN4 are the same in that they sense the threshold voltage of the driving TFT D-TFT. The third sensing SEN3 and the fourth sensing SEN4 are different in that the sampling is performed at a point in time after the saturation point SAT in the third sensing SEN3, but the sampling is performed at a point in time before the saturation point SAT in the fourth sensing SEN4.

Figure 8D:
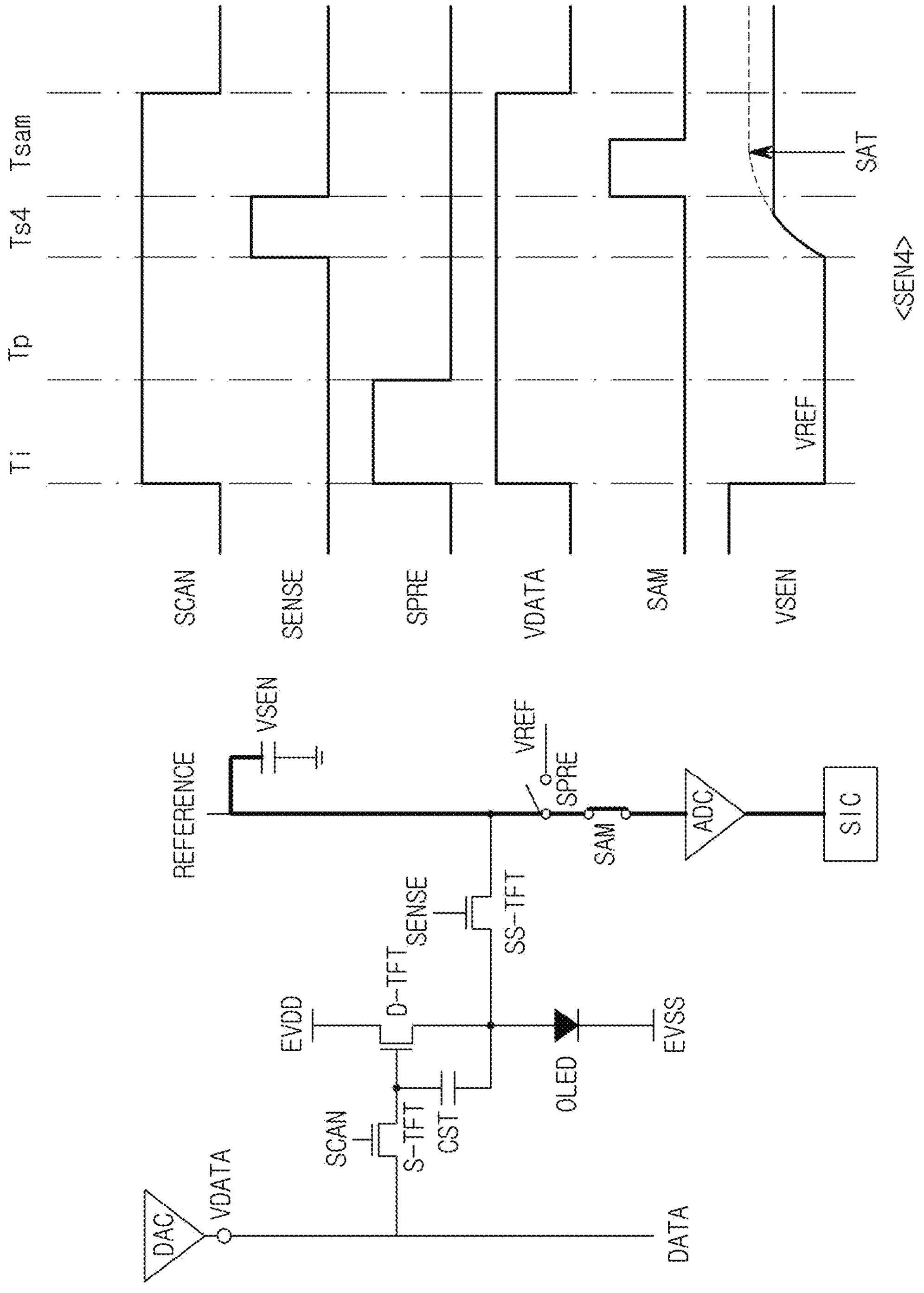

Referring to FIG. 8D, in the sampling period Tsam, the sensing TFT SS-TFT is turned off and the switch SAM is turned on. Accordingly, the sensing voltage VSEN is applied to the data driver S-IC via the ADC through the reference line REFERENCE. The data driver SIC to which the sensing voltage VSEN is applied may sense the threshold voltage of the driving TFT D-TFT.

Meanwhile, since sampling is performed before the driving transistor D-TFT is saturated in the fourth sensing SEN4 according to the present specification, the sensing accuracy in the fourth sensing SEN4 may be less than that in the third sensing SEN3. According to an embodiment of the present specification, the sensing accuracy may be increased by referring to a lookup table based on a sensing value sensed in the fourth sensing SEN4. It will be described later with reference to FIG. 9.

FIG. 9 is a diagram for describing a fourth sensing SEN4 according to an embodiment of the present specification.

Referring to FIG. 9, the sensing values SVs sensed through the fourth sensing SEN4 for a total of N scan lines SL1 to SLN are illustrated. A LUT value LV corresponding to each sensed value SV may be set in advance. The LUT value represents an estimated threshold voltage of the driving transistor when the threshold voltage is saturated. In one embodiment, the LUT value LV for each sensed value SV is greater than the sensed value SV since the sensed value SV occurs prior to the threshold voltage of the driving transistor saturating. That is, a lookup table prepared in the form of LUT values LVs corresponding to the sensed values SVs may be stored in the memory of the display apparatus.

For example, when the sensed value SV of the first scan line SL1 sensed through the fourth sensing SEN4 is 150, the LUT value LV may be 240. For example, when the sensed value SV of the second scan line SL2 sensed through the fourth sensing SEN4 is 155, the LUT value LV may be 248. For example, when the sensed value SV of the third scan line SL3 sensed through the fourth sensing SEN4 is 120, the LUT value LV may be 220. For example, when the sensed value SV of the fourth scan line SL4 sensed through the fourth sensing SEN4 is 100, the LUT value LV may be 210.

In this way, the sensed value SV may be obtained by performing the fourth sensing SEN4 on each of the first to Nth scan lines SL1 to SLN. The fourth sensing SEN4 is a result of sensing the threshold voltage of the driving transistor, and sampling is performed before the threshold voltage is saturated. Therefore, a lower value may be derived compared to the sensed value obtained by sampling after the threshold voltage is saturated (e.g., a sensing value by the third sensing SEN3), which may lead to inaccurate sensing.

The LUT value LV may be a value set for each value SV sensed by the fourth sensing SEN4. The LUT value LV may be a value generated based on actually measured data of a value sensed before the threshold voltage is saturated and a value sensed after the threshold voltage is saturated, reflecting characteristics of a manufacturing process of the display panel.

A compensation value compV for compensating the subpixel may be determined based on the LUT value LV. For example, the compensation value CompV may be determined as the same value as the LUT value LV. By determining the compensation value CompV for compensating the subpixel based on the LUT value LV rather than the sensing value SV, a problem of low sensing accuracy that may occur due to the fourth sensing SEN4 may be solved.

FIG. 10 is a diagram for describing a fourth sensing SEN4 according to another embodiment of the present specification.

Unlike the embodiment described with reference to FIG. 9, the fourth sensing SEN4 is not performed on all scan lines SL1 to SLN in another embodiment to be described with reference to FIG. 10. Instead, in another embodiment, the fourth sensing SEN4 may be performed only on some scan lines SL1, SL4, . . . SLM, SLM+3, . . . SLN−3, and SNL.

The fourth sensing SEN4 may be performed only for every Kth scan line. For example, assume a display panel including a first scan line SL1 to an Nth scan line SLN. The fourth sensing SEN4 may be performed on the Mth scan line SLM and the M+Kth scan line SLM+K (e.g., a first portion of gate lines). M is an integer greater than 1 and less than N. K is an integer greater than 1 and less than or equal to M. In the description with reference to FIG. 10, it will be described that M is 3. The fourth sensing SEN4 may not be performed on the M+Lth scan line SLM+L. L is an integer greater than or equal to 1 and less than K. In the tenth, L may be determined to be 1 or 2. Therefore, the fourth sensing SEN4 may not be performed on the M+1th scan line SLM+1 and the M+2th scan line SLM+2 (e.g., a second portion of the gate lines).

K may be a preset value. Referring to FIG. 10, the fourth sensing SEN4 is performed on the first scan line SL1. Since K is 3, the fourth sensing SEN4 is performed on the fourth scan line SL4. The fourth sensing SEN4 is not performed on the second scan line SL2 and the third scan line SL3. Also, the fourth sensing SEN4 will be performed on the seventh and tenth scan lines. When the fourth sensing SEN4 is performed on the Mth scan line SLM, the fourth sensing SEN4 is performed on the M+3th scan line SLM+3. Before the fourth sensing SEN4 is performed on the Nth scan line SLN, the fourth sensing SEN4 is performed on the N−3 scan line SLN−3.

The LUT values LV may be determined for the Mth scan line SLM and the M+Kth scan line SLM+K on which the fourth sensing SEN4 is performed. Referring to FIG. 10, the LUT values LV may be determined for scan lines SL1, SL4, . . . SLM, SLM+3, . . . SLN−3, and SLN on which fourth sensing SEN4 is performed. For the scan lines SL1, SL4, . . . SLM, SLM+3, . . . SLN−3, and SLN on which the fourth sensing SEN4 is performed, the LUT value LV may be determined as the compensation value compV. This is as described above with reference to FIG. 9.

For the M+Lth scan line SLM+L on which the fourth sensing SEN4 is not performed, the LUT value LV is not determined, and the compensation value compV may be estimated based on the LUT value LV for the Mth scan line SLM and the M+Kth scan line SLM+L. Referring to FIG. 10, the LUT values LVs are not determined for the scan lines SL2, SL3, . . . SLM+1, SLM+2, . . . SLN−2, SLN1 on which sensing is not performed. The compensation values compVs for the scan lines SL2, SL3, . . . SLM+1, SLM+2, . . . SLN−2, SLN1 on which the fourth sensing SEN4 is not performed may be estimated based on the compensation values compVs of the preceding and succeeding scan lines on which sensing is performed. For example, the compensation value for the second scan line SL2 and the compensation value for the third scan line SL3 may be estimated based on the compensation value of the first scan line SL1 and the compensation value for the fourth scan line SL4. In the example illustrated in FIG. 10, when the compensation value for the first scan line SL1 is determined to be 240 and the compensation value for the fourth scan line SL4 is determined to be 210, a compensation value for the second scan line SL2 and the third scan line SL3 may be determined based on an equality relationship. The compensation value compV for the second scan line SL2 may be determined to be 230. The compensation value comV for the third scan line SL3 may be determined to be 220. 230 and 220, and 240 and 210 are in an equal relationship.

Compared to the embodiment illustrated in FIG. 9, another embodiment illustrated in FIG. 10 reduces the number of scan lines to be sensed, thereby further reducing the time required for the fourth sensing SEN4. In addition, sensing accuracy may be secured by estimating scan lines on which sensing is not performed based on compensation values of the sensing scan lines.

Meanwhile, although not illustrated, the fourth sensing SEN4 may be performed on pixels of all colors or only on pixels of some colors. For example, the degradation of display quality when the display apparatus is initially driven (power-on) due to a shift in the threshold voltage of the driving transistor may occur confined to a specific color. For example, degradation of display quality when the display apparatus is initially driven may appear as local blurring of white color. This is because in the case of colors other than white (R, G, and B), even if a blurring phenomenon occurs, the other colors are not recognized by the user's naked eyes, but white color is noticeably visible to the naked eye. The fourth sensing SEN4 proposed in this specification is applied when the display apparatus is initially driven, and even if the fourth sensing SEN4 is performed only for a specific color (e.g., white color), it can be recognized as normal display quality by the user's naked eyes.

Meanwhile, although not illustrated, whether to activate the fourth sensing SEN4 may be preset. If the fourth sensing SEN4 is set to be activated, the fourth sensing SEN4 may be performed, and if the fourth sensing SEN4 is set to be deactivated, the fourth sensing SEN4 may not be performed. That is, the fourth sensing SEN4 may be selectively performed based on activation. This is because, as described above, the time required for the fourth sensing SEN4 is between 2 and 20 seconds. This is because, after the display apparatus is delivered to the user, if it takes more than 10 seconds before an image is displayed after the user powers on the display apparatus, the user may experience inconvenience. For another example, the quality of the display panel may be inspected before the assembly process of the display apparatus is performed or after the assembly process is completed. In this case, the threshold voltage as well as the mobility of the driving transistor must be compensated before the display apparatus displays an image so that quality can be accurately inspected. Accordingly, the fourth sensing SEN4 may be selectively performed in consideration of the process time and based on the quality result. For example, if the first sensing SEN1 determines that a product is normal, the fourth sensing SEN4 does not have to be performed. If the first sensing SEN1 determines that the product is defective, the fourth sensing SEN4 may be activated to re-examine the quality.

Meanwhile, although not illustrated, the display apparatus may further include a timer circuit for calculating driving time and/or non-driving time. The fourth sensing SEN4 may be performed responsive to the non-driving time exceeding a preset time. Specifically, the shift of the threshold voltage of the driving transistor may not occur degradation when the display apparatus is driven periodically. This is because the threshold voltage is sensed and compensated for by the third sensing SEN3 described above after the display apparatus is powered off. As the non-driving time of the display apparatus increases, the threshold voltage of the driving transistor shifts significantly. This is because a long time has elapsed since the threshold voltage of the driving transistor is compensated by the third sensing SEN3 for the same reason. Accordingly, the fourth sensing SEN4 may be performed when the non-driving time of the display apparatus exceeds a preset time.

Figure 11:
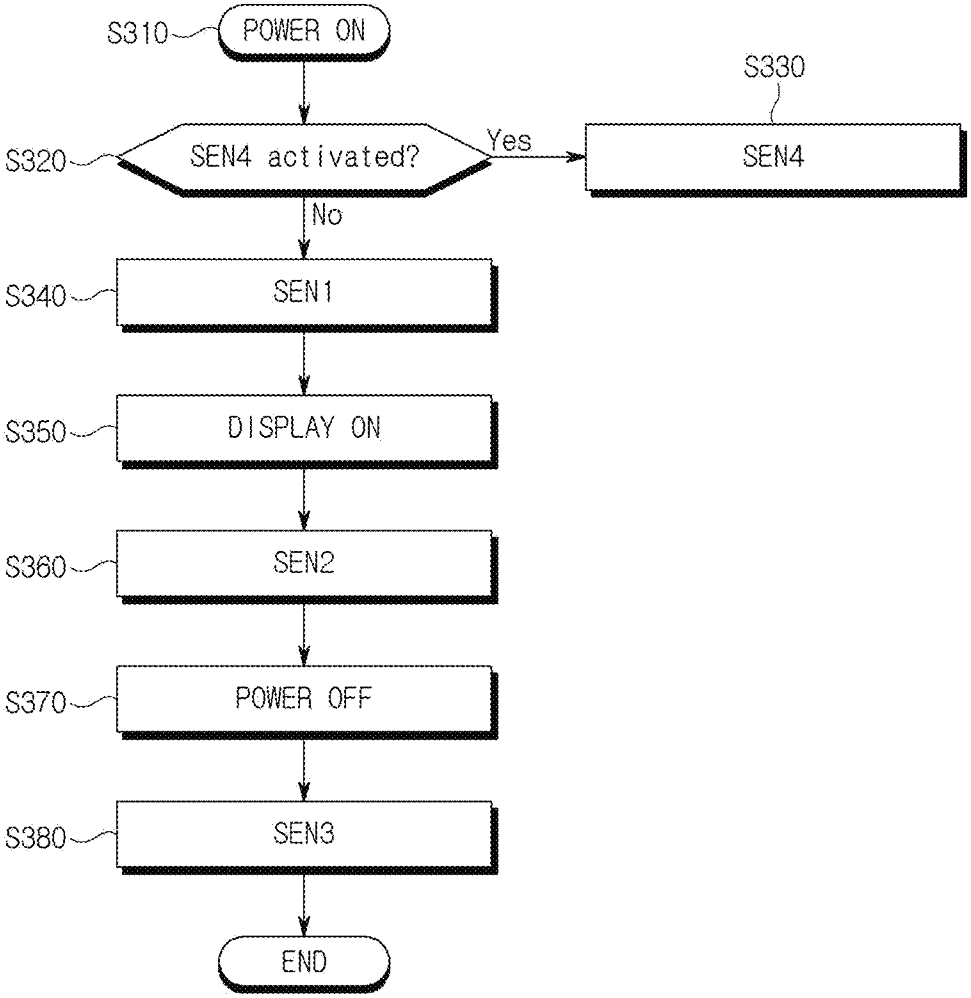
FIG. 11 is a diagram for describing a sensing method of a display apparatus according to one embodiment of the present specification.

FIG. 11 is a diagram for describing a sensing method of a display apparatus according to one embodiment of the present specification.

Referring to FIG. 11, an operation of powering on a display apparatus is performed S310. When the display apparatus is powered on, a first sensing SEN1 is performed S340. The powering on the display apparatus means that power is applied to the display apparatus from the outside and applied to a control PCB (refer to C-PCB in FIG. 2) disposed inside the display apparatus. The turning on the display means that a data voltage (see VDATA in FIG. 2) is applied to the subpixel from a data driver (see SIC in FIG. 2). Therefore, the first sensing SEN1 may be performed during a short time of several seconds after the display apparatus is powered on and before a timing controller, a gate driver, and a data driver start operations. That is, the first sensing SEN1 may be performed after the display apparatus is powered on and before the display is turned on. That is, the first sensing SEN1 is sensing performed in a state in which the display is still off after the display apparatus is powered on. Such first sensing SEN1 may be referred to as 'power-on mobility sensing'. A subject to be sensed by the first sensing SEN1 is the mobility of the driving transistor. The first sensing SEN1 is as described above with reference to FIGS. 5A to 5D.

After the first sensing is performed S340, the display is turned on S350.

After the display is turned on, a second sensing is performed S360. The second sensing SEN2 may be performed after the display apparatus is powered on and while the display is turned on. That is, the second sensing SEN2 is sensing performed on one gate line in every frame while an image is displayed. Such second sensing SEN2 may be referred to as 'real-time mobility sensing'. A subject to be sensed by the second sensing SEN2 is the mobility of the driving transistor. As described above, sensing the mobility of the driving transistor takes a very short time to sense one subpixel. In addition, the second sensing SEN2 should be performed during real time when an image is displayed. Accordingly, the second sensing SEN2 may be performed only on subpixels disposed on one gate line during a period between frames of image data (i.e., a vertical blank period). A vertical blank period during which the second sensing SNE2 is performed may be about 300 us. Description of the second sensing SEN2 is as described above with reference to FIGS. 6A to 6E.

An instruction to turn off the power of the display apparatus is received S370.

After the display apparatus is powered off, a third sensing SEN3 is performed S380. More specifically, when a user turns off power of a display apparatus such as a TV through a remote control, the display may be turned off, but the control PCB may be controlled to maintain power application. A timing controller, memory, and power block (see FIGS. 1 and 2) disposed on the control PCB may perform the third sensing SEN3 through applied power. The third sensing SEN3 may be referred to as 'power-off threshold voltage sensing'. A subject to be sensed by the third sensing SEN3 is the threshold voltage Vth of the driving transistor. In order to sense the threshold voltage of the driving transistor, it is generally required to drive the driving transistor in a source follower manner to saturate the driving transistor. The degradation of the driving transistor may be sensed by sampling a voltage applied to a source electrode of the driving transistor after the driving transistor is saturated. The time required to sense all subpixels of the display apparatus is different depending on the type (size) of the display apparatus, but is generally 300 seconds or more. The third sensing is as described above with reference to FIGS. 7A to 7D.

Meanwhile, an operation of determining whether the fourth sensing SEN4 is activated after the display apparatus is powered on may be performed S320. Whether to activate the fourth sensing SEN4 may be set in advance. If the fourth sensing SEN4 is set to be activated, the fourth sensing SEN4 may be performed, and if the fourth sensing SEN4 is set to be deactivated, the fourth sensing SEN4 may not be performed. That is, the fourth sensing SEN4 may be selectively performed based on activation. This is because, as described above, the fourth sensing SEN4 takes between 2 and 20 seconds. This is because, after the display apparatus is delivered to the user, if it takes more than 10 seconds before an image is displayed after the user powers on the display apparatus, the user may experience inconvenience. For another example, the quality of the display panel may be inspected before the assembly process of the display apparatus is performed or after the assembly process is completed. In this case, the threshold voltage as well as the mobility of the driving transistor must be compensated before the display apparatus displays an image so that quality can be accurately inspected. Accordingly, the fourth sensing SEN4 may be selectively performed in consideration of the process time and based on the quality result. For example, if the first sensing SEN1 determines that a product is normal, the fourth sensing SEN4 does not have to be performed. If the first sensing SEN1 determines that the product is defective, the fourth sensing SEN4 may be activated to re-examine the quality.

As a result of the determination, if the fourth sensing SEN4 is activated, the fourth sensing SEN4 may be performed S330. The fourth sensing SEN4 is sensing performed after the display apparatus is powered on and in a state where the display is turned off. A point in time at which the fourth sensing SEN4 is performed is the same as a point in time at which first sensing SEN1 is performed. However, the fourth sensing SEN4 senses the threshold voltage of the driving transistor and may be distinguished from the first sensing SEN1 sensing the mobility of the driving transistor. The fourth sensing SEN4 is identical to the third sensing SEN3 in that it senses the threshold voltage of the driving transistor. However, the fourth sensing SEN4 may be distinguished from the third sensing SEN3 in that it is performed at a higher speed. Also, the third sensing SEN3 and the fourth sensing SEN4 may be distinguished in that the third sensing SEN3 is performed after power-off of the display apparatus and the fourth sensing SEN4 is performed after power-on of the display apparatus. That is, since the fourth sensing SEN4 may be performed at high speed, the fourth sensing SEN4 may be performed after the display apparatus is powered on but before the display is turned on. The fourth sensing SEN4 may be referred to as 'power-on high-speed threshold voltage sensing'. A subject to be sensed by the fourth sensing SEN4 is the threshold voltage of the driving transistor. While the fourth sensing SEN4 is performed to sense the threshold voltage of the driving transistor, the driving transistor is driven in a source follower manner. In the third sensing SEN3 compared to the fourth sensing SEN4, sampling is performed after the driving transistor is saturated. In the fourth sensing SEN4, sampling is performed before the driving transistor is saturated. According to the fourth sensing SEN4, sampling is performed before the time it takes for the drive transistor to saturate, so that the fourth sensing is capable of high-speed sensing compared to the third sensing SEN3. The time required for the fourth sensing SEN4 is 2 to 20 seconds and may be adjusted according to various embodiments of the present specification. Compared to the time required for the third sensing SEN3, that is, 330 seconds, the time required for the fourth sensing SEN4 may be drastically reduced. A detailed operation of the fourth sensing SEN4 according to the present specification is the same as described above with reference to FIGS. 8A to 8D. Meanwhile, according to the present specification, in the case of the fourth sensing SEN4, degradation in sensing accuracy that may occur due to sampling being performed before the driving transistor is saturated can be resolved by referring to the lookup table. This is as described above with reference to FIG. 9.

In FIG. 11, the fourth sensing SEN4 is performed earlier than the first sensing SEN1. However, the first sensing SEN4 may be performed before the fourth sensing SEN4.

Also, before performing the fourth sensing SEN4, an operation of calculating the non-driving time of the display apparatus may be performed. This is as described above with reference to FIG. 10.

The foregoing is merely an illustration of a specific embodiment of the display apparatus.

Therefore, it should be noted that those skilled in the art can easily understand that the present disclosure can be substituted or modified in various forms without departing from the spirit of the present disclosure described in the claims below.

The present specification discloses a display apparatus comprising a display panel including a plurality of subpixels each including a driving transistor; a gate driver that supplies a scan signal to the subpixels through a gate line; and a data driver that supplies a data voltage to the subpixels through a data line, wherein a fourth sensing for sensing a threshold voltage of the driving transistor is performed after the display apparatus is powered on and before an image is displayed.

A first sensing for sensing a mobility of the driving transistor may be performed after the display apparatus is powered on and before the image is displayed.

A second sensing for sensing the mobility of the driving transistor may be performed after the image is displayed.

A third sensing for sensing a threshold voltage of the driving transistor may be performed after the display apparatus is powered off.

The fourth sensing may sample the threshold voltage of the driving transistor before the threshold voltage is saturated.

The apparatus may further comprise a memory that stores a lookup table recording a value sensed by the fourth sensing and a LUT value matching the sensed value.

The gate line includes a first line to an Nth scan line, the fourth sensing is performed on each of the first to Nth scan lines, and the LUT value may be determined to be a compensation value for compensating the driving transistor.

The gate line may include a first scan line to an Nth scan line, and the fourth sensing may be performed on a Mth scan line and a M+Kth scan line, but may not be performed on a M+Lth scan line (M is an integer greater than 1 and less than N, K is an integer greater than 1 and less than M, and L is an integer greater than 1 and less than K).

The compensation values of the driving transistors of the Mth scan line and M+Kth scan line may be determined by the LUT value, and the compensation value of the driving transistor of the M+Lth scan line may be estimated based on the LUT value.

The fourth sensing may be performed on the subpixel having a specific color.

The fourth sensing may be performed on the subpixel having a white color.

The fourth sensing may be selectively performed based on activation.

The display apparatus may further comprise a timer that calculates a non-driving time of the display apparatus, and the fourth sensing may be performed when the non-driving time exceeds a preset time.

The present specification discloses a method for sensing and compensating for a display apparatus comprising a plurality of subpixels each including a driving transistor. The method comprises the operations of a first sensing of sensing a mobility of the driving transistor after the display apparatus is powered on and before an image is displayed; a second sensing of sensing the mobility of the driving transistor after the image is displayed; and a third sensing of sensing a threshold voltage of the driving transistor after the display apparatus is powered off. The method further comprises the operation of a fourth sensing of sensing the threshold voltage of the driving transistor after the display apparatus is powered on and before the image is displayed.

The operation of the fourth sensing may be performed before the operation of the first sensing.

The operation of the fourth sensing may be performed after the operation of the first sensing.

The operation of the fourth sensing may include the operation of sampling the threshold voltage of the driving transistor before displaying the threshold voltage of the driving transistor.

The operation of the fourth sensing may be performed only on some scan lines of the display apparatus, and a compensation value of a scan line that is not sensed may be estimated.

The compensation values of the subpixels may be determined by referring to a lookup table that stores a value sensed by the fourth sensing and an LUT value matching the sensed value.

The fourth sensing may be performed on the subpixel having a specific color.

The method may further comprise the operation of determining whether the fourth sensing is activated before performing the fourth sensing.

The method may further comprise the operation of calculating a non-driving time of the display apparatus before performing the fourth sensing.

DESCRIPTION OF REFERENCE NUMERALS

100: display apparatus
TCON: timing controller
DIC: data driver
GIC: gate driver
MEM: memory
PB: power block

What is claimed is:

1. A display apparatus comprising:

a display panel including a plurality of subpixels, each of the plurality of subpixels including a driving transistor;

a gate driver configured to supply a scan signal to the plurality of subpixels through gate lines that are connected to the plurality of subpixels; and a data driver configured to supply data voltages to the plurality of subpixels through data lines that are connected to the plurality of subpixels, wherein a fourth sensing during which a threshold voltage of a driving transistor from at least one of the plurality of subpixels is sensed is performed responsive to a power signal changing from a first level to a second level that initiates a process of turning on the display panel, the fourth sensing occurring while the display panel is turned off and before an image is displayed by the display panel, wherein a third sensing during which the threshold voltage of the driving transistor is sensed is performed after the image was displayed by the display panel and while the display panel is turned off, and wherein a time period of the fourth sensing is shorter than a time period of the third sensing.

2. The display apparatus of claim 1, wherein a first sensing during which a mobility of the driving transistor is sensed is performed after the fourth sensing, after the display apparatus is powered on, and before the image is displayed.

3. The display apparatus of claim 2, wherein a second sensing during which the mobility of the driving transistor is sensed is performed after the first sensing and after the image is displayed.

4. The display apparatus of claim 3, wherein the third sensing during which the threshold voltage of the driving transistor is sensed is performed after the second sensing.

5. The display apparatus of claim 4, wherein the third sensing samples the threshold voltage of the driving transistor after the threshold voltage is saturated.

6. The display apparatus of claim 5, further comprising:

a memory configured to store a lookup table (LUT) having a value of the threshold voltage of the driving transistor sensed during the fourth sensing prior to saturation of the driving transistor, and a LUT value corresponding to the sensed value of the threshold voltage.

7. The display apparatus of claim 6, wherein the fourth sensing is performed on each of the plurality of subpixels connected to the gate lines, and the LUT value is a compensation value for compensating the driving transistor.

8. The display apparatus of claim 6, wherein the fourth sensing is performed on a first portion of the plurality of subpixels connected to a first portion of the gate lines but not performed on a second portion of the plurality of subpixels that are connected to a second portion of the gate lines.

9. The display apparatus of claim 8, wherein compensation values of driving transistors of the first portion of the plurality of subpixels are determined by LUT values stored in the LUT, and compensation values of driving transistors of the second portion of subpixels are estimated based on the LUT values.

10. The display apparatus of claim 1, wherein the fourth sensing is performed on a subpixel from the plurality of subpixels having a specific color.

11. The display apparatus of claim 10, wherein the specific color is white.

12. The display apparatus of claim 1, wherein the fourth sensing is selectively performed based on activation of the fourth sensing.

13. The display apparatus of claim 1, further comprising:

a timer circuit configured to calculate a non-driving time of the display apparatus, and the fourth sensing is performed responsive to the non-driving time exceeding a preset time.

* * * * *